US012675332B2

(12) United States Patent
Wang et al.

(10) Patent No.: US 12,675,332 B2
(45) Date of Patent: Jul. 7, 2026

(54) RESOURCE SCHEDULING METHOD AND SERVER BASED ON IDLE TIME POINT

(71) Applicant: Alibaba (China) Co., Ltd., Hangzhou (CN)

(72) Inventors: Meng Wang, Beijing (CN); Pengyu Zhang, Bellevue, WA (US); Yunshan Jia, Beijing (CN); Biyi Li, Beijing (CN)

(73) Assignee: Alibaba (China) Co., Ltd., Hangzhou (CN)

( * ) Notice: Subject to any disclaimer, the term of this patent is extended or adjusted under 35 U.S.C. 154(b) by 644 days.

(21) Appl. No.: 18/171,250

(22) Filed: Feb. 17, 2023

(65) Prior Publication Data

US 2024/0054021 A1      Feb. 15, 2024

(30) Foreign Application Priority Data

Aug. 15, 2022      (CN) .......................... 202210972195.0

(51) Int. Cl.
*G06F 9/50* (2006.01)
*G06F 9/48* (2006.01)

(52) U.S. Cl.
CPC .............. *G06F 9/505* (2013.01); *G06F 9/485* (2013.01); *G06F 9/4881* (2013.01); *G06F 9/4887* (2013.01); *G06F 9/5027* (2013.01); *G06F 9/5038* (2013.01); *G06F 2209/5017* (2013.01); *G06F 2209/5018* (2013.01)

(58) Field of Classification Search
None
See application file for complete search history.

(56) References Cited

U.S. PATENT DOCUMENTS

| | | | |
|---|---|---|---|
| 10,574,584 B1 * | 2/2020 | Young ................... | H04L 41/142 |
| 12,277,449 B1 * | 4/2025 | Pathak ................. | G06F 9/5038 |
| 2016/0353354 A1 * | 12/2016 | Behairy ............... | H04W 48/04 |
| 2017/0104608 A1 * | 4/2017 | Sergeev ............. | H04L 49/3009 |
| 2018/0349202 A1 * | 12/2018 | Sharma .............. | H04L 41/0897 |
| 2019/0007320 A1 * | 1/2019 | Sukhomlinov ..... | H04L 41/0895 |
| 2019/0265998 A1 * | 8/2019 | Shantamurty ....... | G06F 9/45558 |
| 2020/0259719 A1 * | 8/2020 | Ni ........................... | H04L 41/20 |
| 2020/0334065 A1 * | 10/2020 | Wang ................. | H04L 41/0896 |

(Continued)

*Primary Examiner* — Abu Zar Ghaffari
(74) *Attorney, Agent, or Firm* — Osha Bergman Watanabe & Burton LLP

(57) ABSTRACT

A resource scheduling method and a server are provided, the method including: acquiring, at target scheduling time, an idle time point corresponding to respective virtual network element of the multiple virtual network elements, wherein the idle time point corresponds to a time point at which no load task is polled by a worker thread in the virtual network element; determining load status of the multiple virtual network elements based on time differences between the target scheduling time and the idle time point corresponding to respective virtual network element of the multiple virtual network elements; determining computational resource scheduling information of the multiple virtual network elements based on the load status of the multiple virtual network elements; sending the computational resource scheduling information to a kernel of the server to perform, through a schedule-class function in kernel mode, resource scheduling processing corresponding to the computational resource scheduling information.

16 Claims, 7 Drawing Sheets

(56)     References Cited

U.S. PATENT DOCUMENTS

2021/0103456 A1*  4/2021  Linet ..................... G06F 9/5077
2021/0144056 A1*  5/2021  Chakrapani Rangarajan ..............
                                                    H04L 41/5012
2021/0279107 A1*  9/2021  Qu ....................... G06F 9/45558
2021/0392043 A1* 12/2021  Sethi ................... H04L 43/0882
2022/0255817 A1*  8/2022  Hong .................... G06N 20/00
2023/0188415 A1*  6/2023  Miller .................. H04L 45/586
                                                    370/254

* cited by examiner

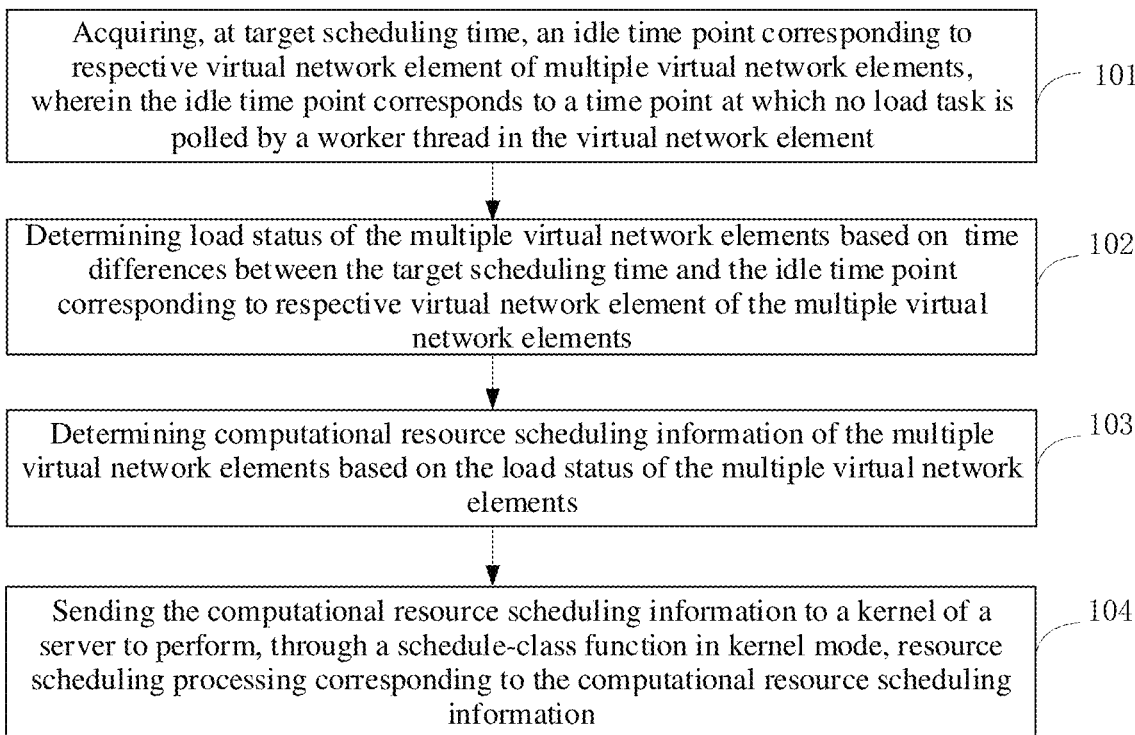

Acquiring, at target scheduling time, an idle time point corresponding to respective virtual network element of multiple virtual network elements, wherein the idle time point corresponds to a time point at which no load task is polled by a worker thread in the virtual network element ⟋ 101

Determining load status of the multiple virtual network elements based on time differences between the target scheduling time and the idle time point corresponding to respective virtual network element of the multiple virtual network elements ⟋ 102

Determining computational resource scheduling information of the multiple virtual network elements based on the load status of the multiple virtual network elements ⟋ 103

Sending the computational resource scheduling information to a kernel of a server to perform, through a schedule-class function in kernel mode, resource scheduling processing corresponding to the computational resource scheduling information ⟋ 104

Fig. 1

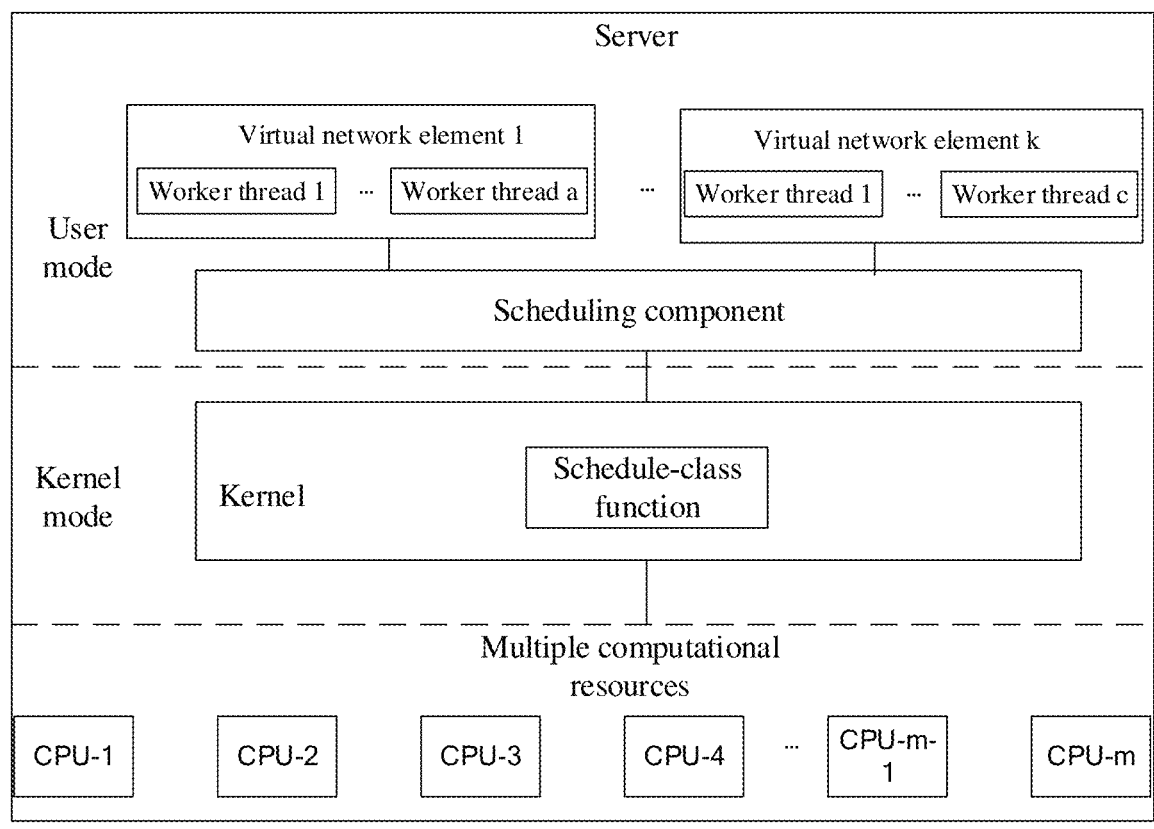

Fig. 2

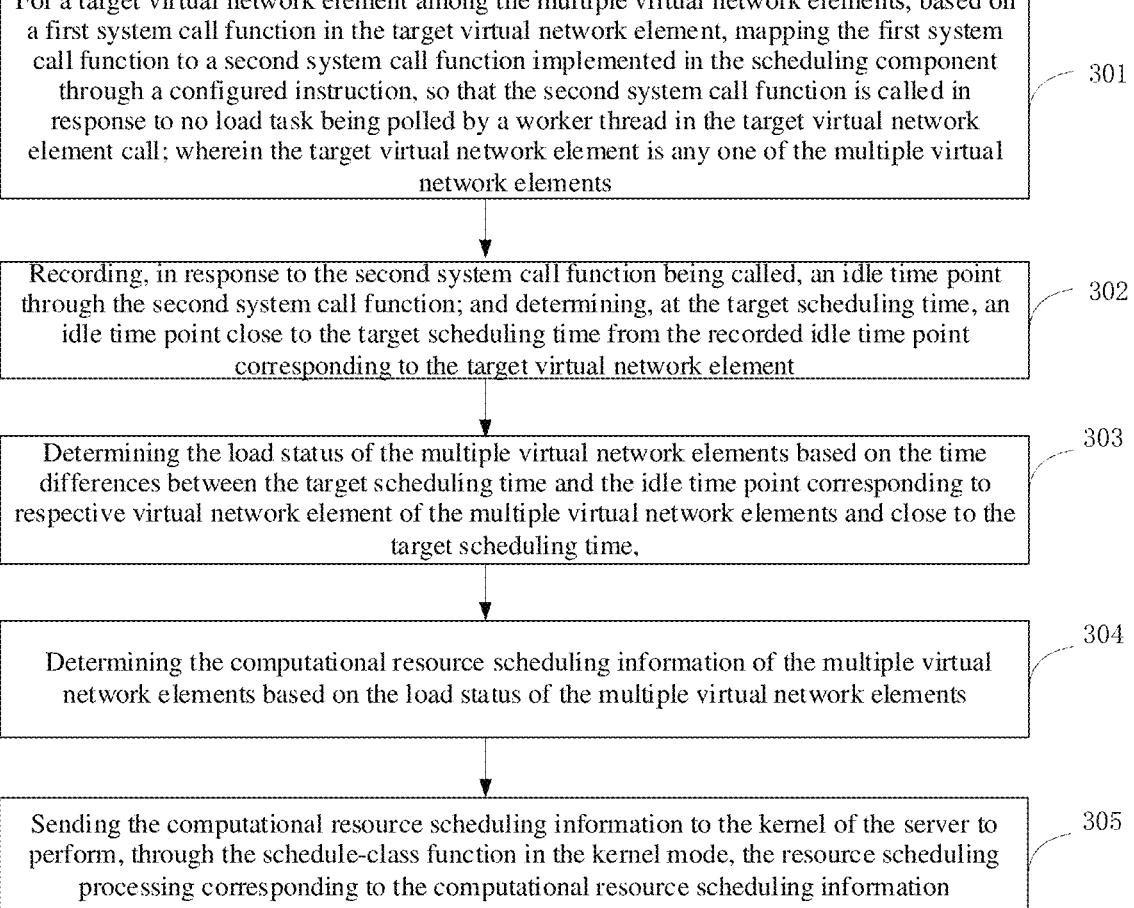

For a target virtual network element among the multiple virtual network elements, based on a first system call function in the target virtual network element, mapping the first system call function to a second system call function implemented in the scheduling component through a configured instruction, so that the second system call function is called in response to no load task being polled by a worker thread in the target virtual network element call; wherein the target virtual network element is any one of the multiple virtual network elements — 301

Recording, in response to the second system call function being called, an idle time point through the second system call function; and determining, at the target scheduling time, an idle time point close to the target scheduling time from the recorded idle time point corresponding to the target virtual network element — 302

Determining the load status of the multiple virtual network elements based on the time differences between the target scheduling time and the idle time point corresponding to respective virtual network element of the multiple virtual network elements and close to the target scheduling time, — 303

Determining the computational resource scheduling information of the multiple virtual network elements based on the load status of the multiple virtual network elements — 304

Sending the computational resource scheduling information to the kernel of the server to perform, through the schedule-class function in the kernel mode, the resource scheduling processing corresponding to the computational resource scheduling information — 305

Fig. 3

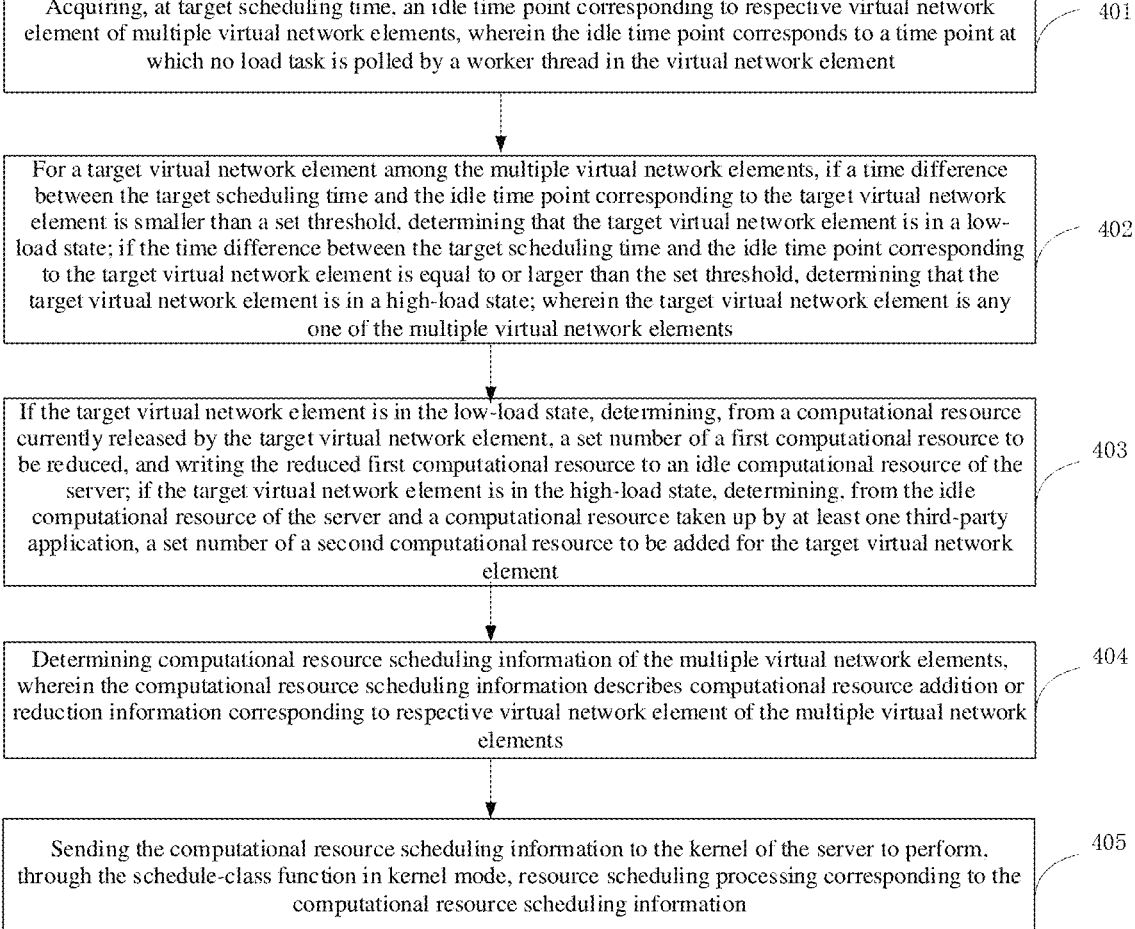

Acquiring, at target scheduling time, an idle time point corresponding to respective virtual network element of multiple virtual network elements, wherein the idle time point corresponds to a time point at which no load task is polled by a worker thread in the virtual network element          401

For a target virtual network element among the multiple virtual network elements, if a time difference between the target scheduling time and the idle time point corresponding to the target virtual network element is smaller than a set threshold, determining that the target virtual network element is in a low-load state; if the time difference between the target scheduling time and the idle time point corresponding to the target virtual network element is equal to or larger than the set threshold, determining that the target virtual network element is in a high-load state; wherein the target virtual network element is any one of the multiple virtual network elements          402

If the target virtual network element is in the low-load state, determining, from a computational resource currently released by the target virtual network element, a set number of a first computational resource to be reduced, and writing the reduced first computational resource to an idle computational resource of the server; if the target virtual network element is in the high-load state, determining, from the idle computational resource of the server and a computational resource taken up by at least one third-party application, a set number of a second computational resource to be added for the target virtual network element          403

Determining computational resource scheduling information of the multiple virtual network elements, wherein the computational resource scheduling information describes computational resource addition or reduction information corresponding to respective virtual network element of the multiple virtual network elements          404

Sending the computational resource scheduling information to the kernel of the server to perform, through the schedule-class function in kernel mode, resource scheduling processing corresponding to the computational resource scheduling information          405

Fig. 4

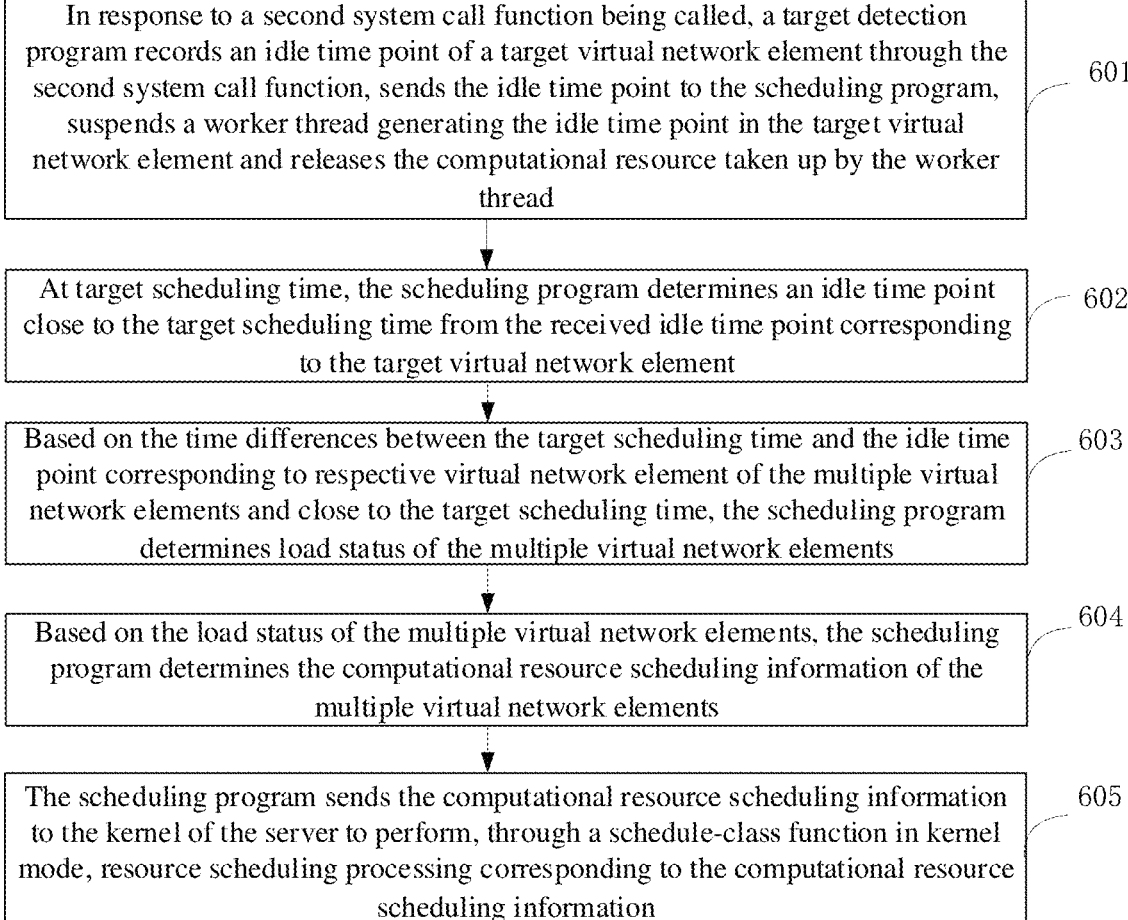

In response to a second system call function being called, a target detection program records an idle time point of a target virtual network element through the second system call function, sends the idle time point to the scheduling program, suspends a worker thread generating the idle time point in the target virtual network element and releases the computational resource taken up by the worker thread — 601

At target scheduling time, the scheduling program determines an idle time point close to the target scheduling time from the received idle time point corresponding to the target virtual network element — 602

Based on the time differences between the target scheduling time and the idle time point corresponding to respective virtual network element of the multiple virtual network elements and close to the target scheduling time, the scheduling program determines load status of the multiple virtual network elements — 603

Based on the load status of the multiple virtual network elements, the scheduling program determines the computational resource scheduling information of the multiple virtual network elements — 604

The scheduling program sends the computational resource scheduling information to the kernel of the server to perform, through a schedule-class function in kernel mode, resource scheduling processing corresponding to the computational resource scheduling information — 605

Fig. 6

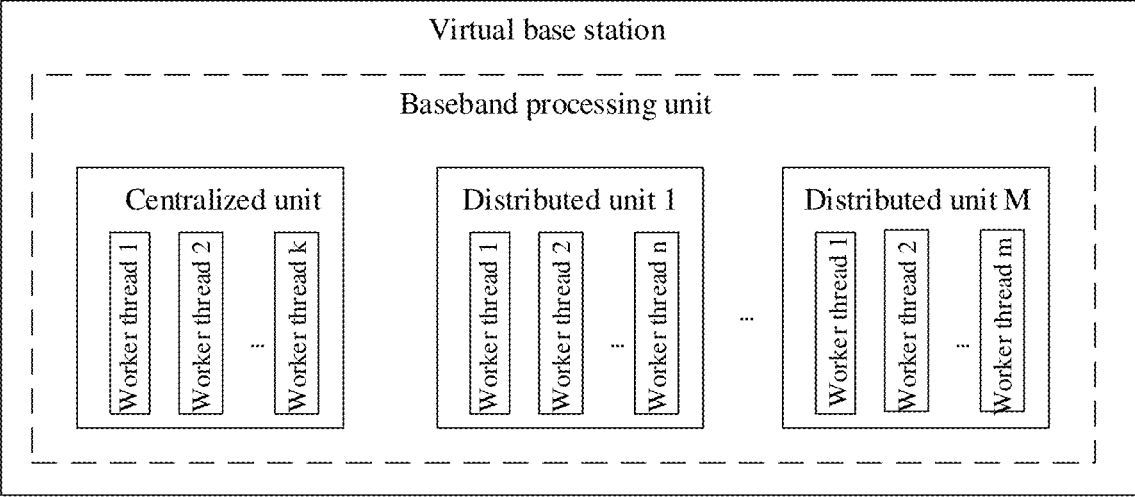

Virtual base station

Baseband processing unit

Centralized unit — Worker thread 1, Worker thread 2, ... Worker thread k

Distributed unit 1 — Worker thread 1, Worker thread 2, ... Worker thread n

...

Distributed unit M — Worker thread 1, Worker thread 2, ... Worker thread m

Fig. 7

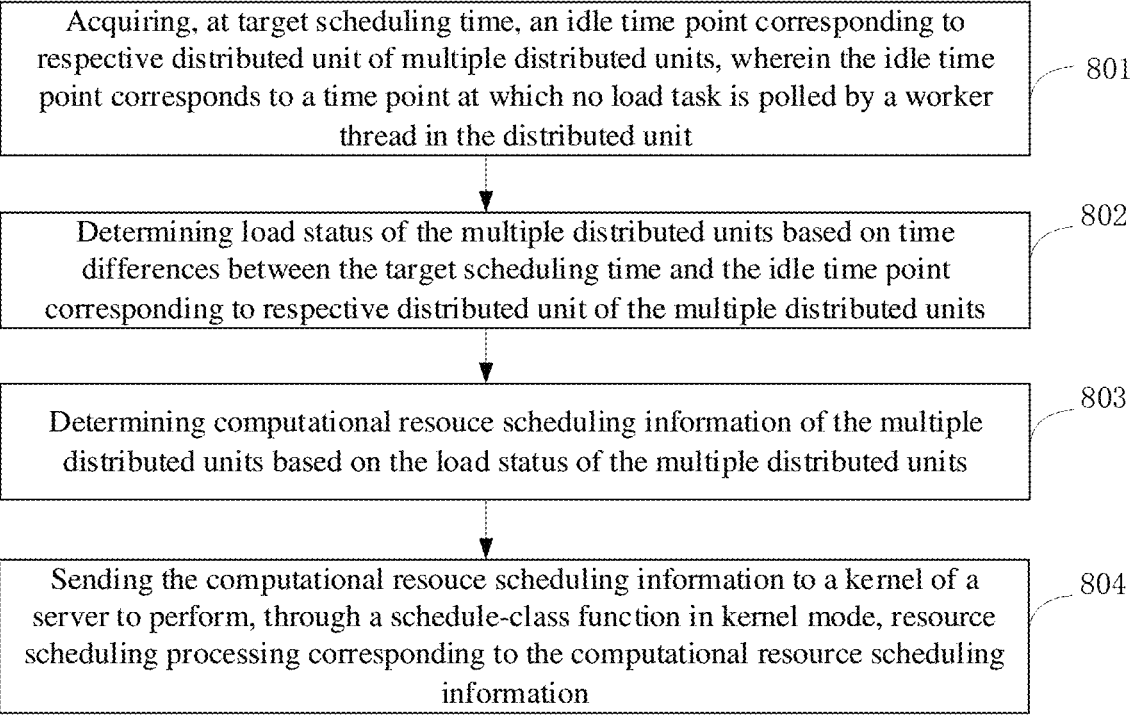

Acquiring, at target scheduling time, an idle time point corresponding to respective distributed unit of multiple distributed units, wherein the idle time point corresponds to a time point at which no load task is polled by a worker thread in the distributed unit — 801

Determining load status of the multiple distributed units based on time differences between the target scheduling time and the idle time point corresponding to respective distributed unit of the multiple distributed units — 802

Determining computational resouce scheduling information of the multiple distributed units based on the load status of the multiple distributed units — 803

Sending the computational resouce scheduling information to a kernel of a server to perform, through a schedule-class function in kernel mode, resource scheduling processing corresponding to the computational resource scheduling information — 804

Fig. 8

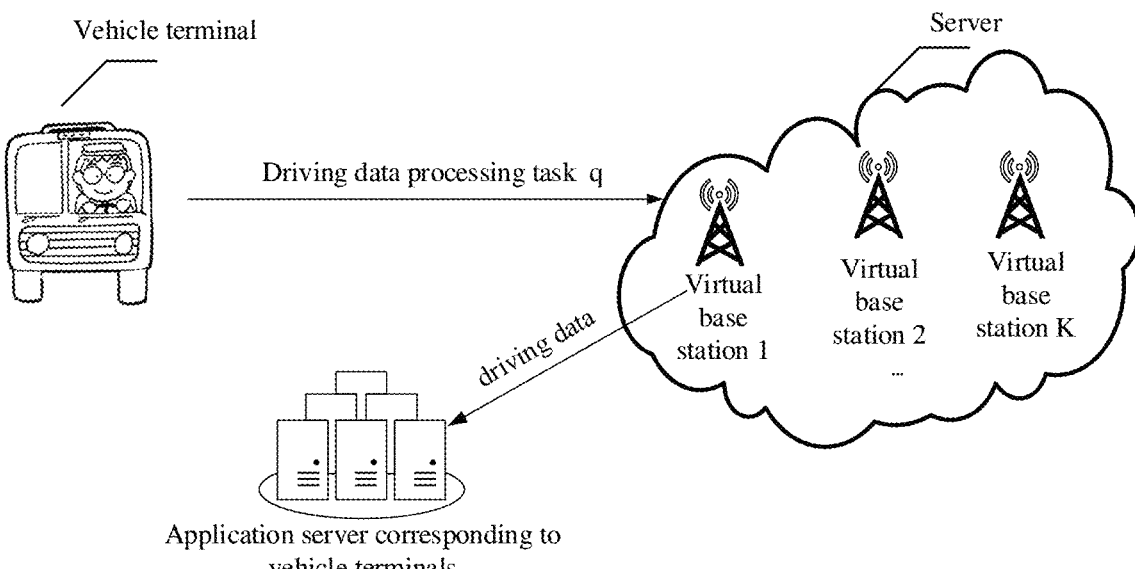

Vehicle terminal

Server

Driving data processing task q

Virtual base station 1

Virtual base station 2

Virtual base station K

...

driving data

Application server corresponding to vehicle terminals

Fig. 9

RESOURCE SCHEDULING METHOD AND SERVER BASED ON IDLE TIME POINT

CROSS-REFERENCE TO RELATED APPLICATIONS

This application claims priority to Chinese patent application, No. 202210972195.0, entitled "RESOURCE SCHEDULING METHOD AND SERVER", filed with the Chinese Patent Office on Aug. 15, 2022, which is hereby incorporated by reference in its entirety.

TECHNICAL FIELD

The present application relates to a field of communication technology, and in particular to a resource scheduling method and a server.

BACKGROUND

With the development of Network Function Virtualization (NFV for short), more and more communication network elements may realize their corresponding functions through software deployed in a server, for example, based on programs of a virtual base station deployed in a server, and functions of baseband may be implemented in the form of software.

By deploying virtual network elements such as virtual base stations in a server, cost reduction in hardware and flexible deployment are achievable. Nevertheless, in a practical use, taking virtual bases station as an example, the virtual base stations are usually deployed separately with other applications and exclusively take up computational resources such as CPU, which are determined based on the load peak, leading to a fact that the virtual base stations in the server face the problem of underutilization of CPU resources.

In addition, in the existing solutions of optimizing the utilization of the CPU resources of the virtual base stations, it is usually needed to modify the program code of the virtual base stations, which is difficult and lack of universality for the programs of virtual base stations of various manufacturers because virtual base stations with different implementations provided by various manufacturers may be deployed in a server.

SUMMARY

The embodiments of the present application provide a resource scheduling method and a server compatible with multiple virtual network elements with different implementations, scheduling computational resources corresponding to the multiple virtual network elements in real time, so as to improve the utilization of the computational resources.

In a first aspect, an embodiment of the present application provides a resource scheduling method, applied to a scheduling component in user mode, wherein the scheduling component is configured in a server including multiple virtual network elements. The method includes: acquiring, at target scheduling time, an idle time point corresponding to respective virtual network element of the multiple virtual network elements, wherein the idle time point corresponds to a time point at which no load task is polled by a worker thread in the virtual network element; determining load status of the multiple virtual network elements based on time differences between the target scheduling time and the idle time point corresponding to respective virtual network element of the multiple virtual network elements; determining computational resource scheduling information of the multiple virtual network elements based on the load status of the multiple virtual network elements; sending the computational resource scheduling information to a kernel of the server to perform, through a schedule-class function in kernel mode, resource scheduling processing corresponding to the computational resource scheduling information.

In a second aspect, an embodiment of the present application provides a resource scheduling apparatus, applied to a scheduling component in user mode, wherein the scheduling component is configured in a server including multiple virtual network elements. The apparatus includes: an acquisition module, configured for acquiring, at target scheduling time, an idle time point corresponding to respective virtual network element of the multiple virtual network elements, wherein the idle time point corresponds to a time point at which no load task is polled by a worker thread in the virtual network element; a processing module, configured for determining load status of the multiple virtual network elements based on time differences between the target scheduling time and the idle time point corresponding to respective virtual network element of the multiple virtual network elements; and determining computational resource scheduling information of the multiple virtual network elements based on the load status of the multiple virtual network elements; a sending module, configured for sending the computational resource scheduling information to a kernel of the server to perform, through a schedule-class function in kernel mode, resource scheduling processing corresponding to the computational resource scheduling information.

In a third aspect, an embodiment of the present application provides a server, including: a scheduling component in user mode, a schedule-class function in kernel mode, multiple virtual network elements and multiple computational resources; the scheduling component is configured for: acquiring, at target scheduling time, an idle time point corresponding to respective virtual network element of the multiple virtual network elements, wherein the idle time point correspond to a time point at which no load task is polled by a worker thread in the virtual network element; determining load status of the multiple virtual network elements based on time differences between the target scheduling time and the idle time point corresponding to respective virtual network element of the plurality of virtual network elements; determining computational resource scheduling information of the multiple virtual network elements based on the load status of the multiple virtual network elements; sending the computational resource scheduling information to a kernel of the server to perform, through the schedule-class function in the kernel mode, resource scheduling processing corresponding to the computational resource scheduling information.

In a fourth aspect, an embodiment of the present application provides a resource scheduling method, applied to a scheduling component in user mode, wherein the scheduling component is configured in a server including multiple virtual base stations which include multiple distributed units. The method includes: acquiring, at target scheduling time, an idle time point corresponding to respective distributed unit of the multiple distributed units, wherein the idle time point corresponds to a time point at which no load task is polled by a worker thread in the distributed unit; determining load status of the multiple distributed units based on time differences between the target scheduling time and the idle time point corresponding to respective distributed unit of the multiple distributed units; determining computational resource scheduling information of the multiple distributed units based on the load status of the multiple distributed units; sending the computational resource scheduling information to a kernel of the server to perform, through a schedule-class function in kernel mode, resource scheduling processing corresponding to the computational resource scheduling information.

In a fifth aspect, an embodiment of the present application provides a resource scheduling method, applied to a scheduling component in user mode, wherein the scheduling component is configured in a server including multiple virtual base stations which include multiple distributed units. The method includes: based on a correspondence between vehicle terminals and virtual base stations, storing driving data processing tasks triggered by the vehicle terminals into task queues corresponding to distributed units of corresponding virtual base stations; at target scheduling time, acquiring an idle time point corresponding to respective distributed unit of the multiple distributed units, wherein the idle time point corresponds to a time point at which no driving data processing task is polled by a worker thread in the distributed unit from a corresponding task queue; determining load status of the multiple distributed units based on time differences between the target scheduling time and the idle time point corresponding to respective distributed unit of the multiple distributed units; determining computational resource scheduling information of the multiple distributed units based on the load status of the multiple distributed units; sending the computational resource scheduling information to a kernel of the server to perform, through a schedule-class function in kernel mode, resource scheduling processing corresponding to the computational resource scheduling information, so that the multiple distributed units process, based on computational resources after the resource scheduling processing, the received driving data processing tasks.

The resource scheduling solution provided by the embodiments of the present application may be used for the allocation and scheduling of the computational resources used by multiple virtual network elements in a server. In order to realize the scheduling solution, two main functional modules need to be configured in the server: a scheduling component in user mode and a schedule-class function in kernel mode, wherein the scheduling component is amounted to a decision maker for determining the result of resource scheduling, and the schedule-class function is amounted to an executor for executing the corresponding resource scheduling processing according to the result of resource scheduling.

Specifically, in the embodiments of the present application, the scheduling component in the user mode may schedule the computational resources corresponding to multiple virtual network elements periodically. Firstly, scheduling indicators for performing resource scheduling are acquired at target scheduling time, i.e., the idle time point corresponding to respective virtual network element of the multiple virtual network elements. The idle time point corresponds to a time point at which no load task is polled by a worker thread in the virtual network element, and the multiple virtual network elements may include virtual network elements which are sensitive to latency, of the same type and different implementations, such as virtual base stations provided by different manufacturers. The virtual network elements with different implementations have commonalities, for example, these virtual network elements operate by polling a task queue through multiple worker threads (e.g., one virtual network element corresponds to one task queue), and perform similar processing when no load task is polled. Based on these commonality, in the embodiments of the present application, the function of recording corresponding time points at which no load task is polled by the worker threads in any virtual network element as the idle time points is realized by the scheduling component. Based on this function, the scheduling component may sense the load status of each virtual network element without modifying the program code of each virtual network element, and thus the implementation is easy and the universality is high. In addition, since the scheduling component may poll the load status of each virtual network element periodically and the scheduling component as well as the multiple virtual network elements, both as applications, are in the user mode, leading to high interaction speed. And since at the interaction, interaction information is the respective idle time points of the multiple virtual network elements, the amount of information is small. Therefore, the communication cost and computational cost of the scheduling component during the process of scheduling are small, and thus the scheduling processing is effective. Therefore, it is realized that the computational resources are scheduled on a finer-grained time basis, which facilitates the improvement of the utilization of computational resources in the server.

BRIEF DESCRIPTION OF THE DRAWINGS

In order to describe the technical solution of the present embodiments more clearly, drawings needed to be used to describe the present embodiments will be briefly introduced below. Obviously, the drawings in the following description are only some embodiments of the present application. Other drawings can be obtained based on these drawings for those of ordinary skill in the art without any creative work.

FIG. 1 is a flow chart of a resource scheduling method according to an embodiment of the present application.

FIG. 2 is a structural schematic diagram of a server according to an embodiment of the present application.

FIG. 3 is a flow chart of another resource scheduling method according to an embodiment of the present application.

FIG. 4 is a flow chart of another resource scheduling method according to an embodiment of the present application.

FIG. 6 is a flow chart of another resource scheduling method according to an embodiment of the present application.

FIG. 7 is a structural schematic diagram of a virtual base station according to an embodiment of the present application.

FIG. 8 is a flow chart of another resource scheduling method according to an embodiment of the present application.

FIG. 9 is a schematic diagram of a scene of a resource scheduling method according to an embodiment of the present application.

DETAILED DESCRIPTION

Figure 5:
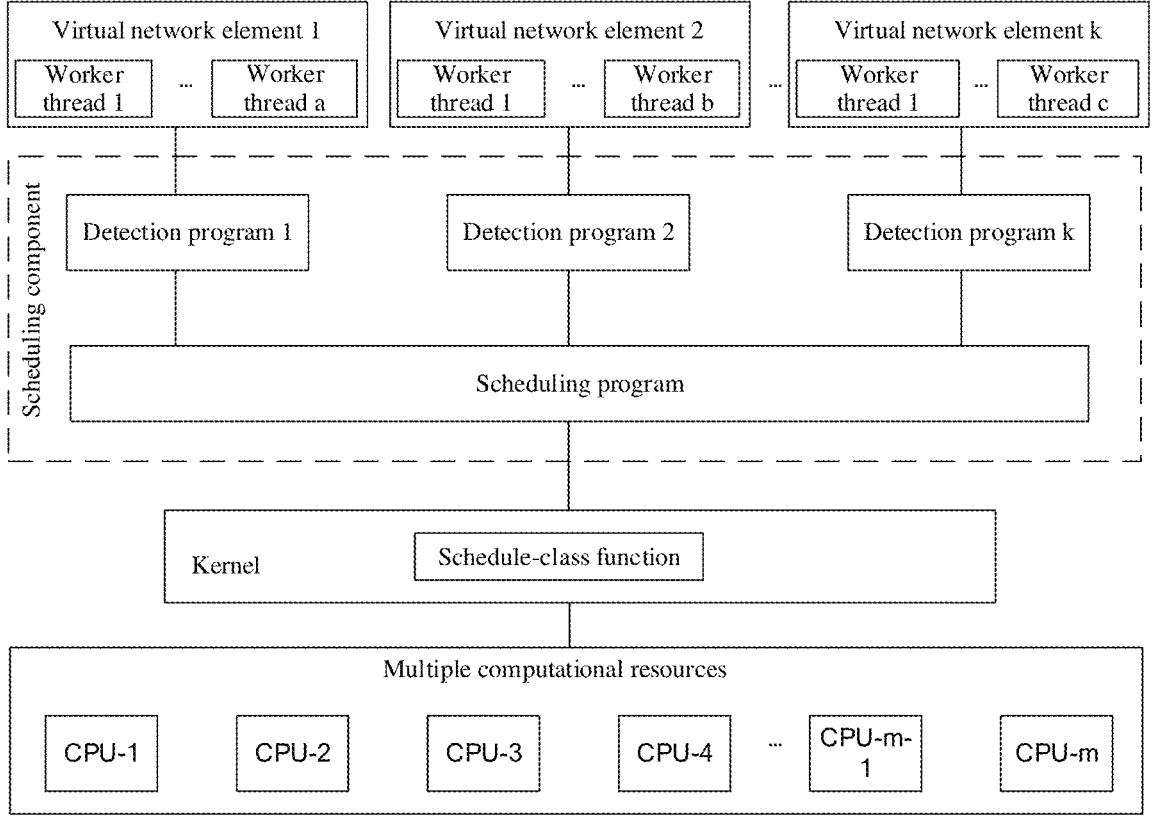
FIG. 5 is a schematic diagram of the multiple virtual network elements and scheduling component according to an embodiment of the present application.

In order to make the objects, technical solutions and advantages clearer, the technical solutions of the embodiments of the present application will be clearly and comprehensively described below in combination with the drawings of the embodiments of the present application. It is obvious that the described embodiments are only some of the embodiments of the present application, rather than all of the embodiments. All the other embodiments obtained based on the embodiments of the present application by a person having ordinary skill in the art without any creative work shall fall within the protection scope of the present application.

Some implementations of the present application will be described below in detail in combination with the drawings. In a case that there is no conflict between each of the embodiments, the embodiments described below as well as the features in the embodiments may be combined with each other.

In addition, the sequence of the steps in each embodiment described below is only exemplary instead of a strict limitation.

With the development of Network Function Virtualization (NFV for short), more and more communication network elements are deployed in a form of software programs in a server, so as to not only reduce hardware costs, but also realize flexible deployment, and therefore provide services that meet clients' need. The virtual network elements deployed in the server include some virtual network elements that are sensitive to latency, such as virtual base stations. In order to satisfy their requirement of the latency, these virtual network elements, at the time of being deployed, takes up exclusively a relatively large number of computational resources (e.g., CPU) to guarantee enough hashrate to timely process load tasks that are sensitive to the latency, which however results in low utilization of their corresponding computational resources. For this reason, it is necessary to schedule the computational resources corresponding to multiple virtual network elements that are sensitive to the latency.

To facilitate understanding, the embodiments take the CPU as an example of the computational resources for illustration. In a practical use, the computational resources may also be computational resources such as GPU, FPGA, various chips, which are not limited in the embodiments.

It should be noted that the multiple virtual network elements sensitive to the latency (hereinafter referred to as "multiple virtual network elements") in the embodiments are virtual network elements that run in the server and have the same function and the same or different implementations, such as multiple virtual base stations provided by different manufacturers, wherein the different implementations are reflected in different program code of the virtual base stations provided by different manufacturers.

In a practical use, the difference in implementations of multiple virtual network elements will lead to difficulty in uniformly scheduling the CPU corresponding to the multiple virtual network elements. Specifically, when scheduling resources, if the virtual network elements with different implementations are scheduled uniformly based on scheduling indicators of coarse time granularity (such as CPU utilization or the like), the real-time performance of resource scheduling of the virtual network elements will be poor due to the large time granularity corresponding to the scheduling indicators, i.e., the indicators would be less capable to reflect the real-time loads of the virtual network elements, which is detrimental to the improvement of the utilization of the computational resources. It needs to modify the applications of the virtual network elements to obtain scheduling indicators of fine time granularity, such as queue length, elapsed time of a task, expires of a task or the like. But for the virtual network elements with different implementations, contents needed to be modified accordingly are also different. For this reason, a resource scheduling solution is usually directed to virtual network elements with a certain implementation, and it is difficult to apply the same to virtual network elements with other implementations, and thus does not have universality (in other words, have poor compatibility).

However, it can be understood that virtual network elements of the same type, although may be implemented in various ways, may still have commonalities during actual operations. For example, each virtual network element corresponds to multiple worker threads at runtime; each worker thread polls load tasks cyclically in a task queue corresponding to the virtual network element; in response to no load task in the task queue being polled by a certain worker thread, the worker thread calls several system call functions to release computational resources that have been taken up, etc.

The embodiments of the present application, based on the commonalities in implementations of multiple virtual network elements, determine a new solution for scheduling the CPU corresponding to the multiple virtual network elements. In this solution, a new scheduling indicator is introduced: an idle time point respectively corresponding to the multiple virtual network elements. From a conceptual point of view, the idle time point corresponds to a time point at which no load task is polled by a worker thread in a virtual network element.

The idle time point is described in detail based on practical operations of a virtual network element. Assume that there are two worker threads corresponding to a virtual network element A of a manufacturer A, which are worker thread 1 and worker thread 2 respectively. A task queue A corresponding to the virtual network element A has two load tasks currently, which are load task 1 and load task 2 respectively. Assume that at the moment t1, the worker thread 1 polls the load task 1, and the worker thread 2 polls the load task 2, then the worker thread 1 executes the load task 1 through CPU-1 that is taken up and the worker thread 2 executes the load task 2 through CPU-2 that is taken up.

Assume that at the moment t2, the worker thread 1 has completed the load task 1 while the worker thread 2 are still executing the load task 2, at this time, the worker thread 1 will poll the task queue A again. If no new load task is added to the task queue A between the moment t1 and moment t2, no load task will be polled by the worker thread 1. In the present embodiment, the time point at which the worker thread fails to poll a load task is referred to as the idle time point, and thus the virtual network element A has a corresponding idle time point t2.

Assume that at the moment t3, the worker thread 2 has completed the load task 2, in a way similar to the worker thread 1, the worker thread 2 will poll the task queue A again. And if no new load task is added to the task queue A between the moment t2 and the moment t3, no load task will be polled by the worker thread 2, and thus the virtual network element A has a new corresponding idle time point t3. In the present embodiment, time points at which each worker thread of a virtual network element fails to poll a load task are referred to as the idle time points corresponding to that virtual network element.

Since the multiple worker threads of the virtual network element will poll load tasks from the task queue of the virtual network element circularly, the virtual network element will generate idle time points continually according to the load tasks in the task queue during the operation. The idle time point corresponds to a time point at which a worker thread fails to poll a task, and at the idle time point, the CPU corresponding to this worker thread does not execute a task and can be safely scheduled without causing program crash.

The objects of introducing the idle time point include: enabling the determination, based on this scheduling indicator, of load conditions of virtual network elements on a finer-grained basis, and realizing unification and secure scheduling of multiple virtual network elements by erasing the differences in code implementation level of different virtual network elements.

To facilitate understanding, a difference presented in code implementation level of virtual network elements with different implementations is first described. In response to no load task being polled by a worker thread of a virtual network element, the CPU taken up by the worker thread is released by executing a system call function (e.g., sleep function, sem-wait function, or the like) specified in program code. However, for virtual network elements with different implementation, the code implementations under the aforementioned execution logic are different, e.g., the system call functions called are different. Additionally, at task execution by virtual network elements sensitive to latency, the interruption of the task is not allowed, and an imposed interruption of the task may cause the program of the virtual network elements unable to run. For this reason, at the time of conducting CPU scheduling to the virtual network elements, it is required to ensure that the time point at which the scheduling is conducted is "safe", that is, scheduling is performed in a case that there is no new task to be executed. Under the condition of not modifying source code, it is very difficult to detect whether a worker thread in a virtual network element is executing a load task at a moment. Therefore, it is a necessary but also challenging task to find a safe scheduling point without modifying the code.

Based on this, to realize unified and real-time CPU scheduling for multiple virtual network elements, it is required to ensure that the selected scheduling indicator (i.e., the idle time point) can be obtained from the outside, i.e., the generation of idle time points can be sensed without modifying the program code of each virtual network element. The outside, in the embodiments of the present application, refers to a scheduling component in the user mode.

In summary, the idle time point can serve as scheduling indicator via which the scheduling component schedules the CPU taken up by multiple virtual network elements.

Based on the scheduling indicator of idle time point, the embodiment provides a resource scheduling method compatible with virtual network elements with various implementations. By the resource scheduling method, real-time scheduling of the computational resources corresponding to the multiple virtual network elements can be realized, thereby improving the utilization of the computational resources in a server. It should be noted that the resource scheduling solution may also be applicable to a case where the multiple virtual network elements are of the same implementation, and may also be applicable to virtual network elements with low requirements on latency.

The resource scheduling method of the present solution is described below in detail in combination with the specific embodiments.

FIG. 1 is a flow chart of a resource scheduling method according to an embodiment of the present application. The method includes, as shown in FIG. 1, the following steps.

101, acquiring, at target scheduling time, an idle time point corresponding to respective virtual network element of multiple virtual network elements, wherein the idle time point corresponds to a time point at which no load task is polled by a worker thread in the virtual network element.

102, determining load status of the multiple virtual network elements based on time differences between the target scheduling time and the idle time point corresponding to respective virtual network element of the multiple virtual network elements.

103, determining computational resource scheduling information of the multiple virtual network elements based on the load status of the multiple virtual network elements.

104, sending the computational resource scheduling information to a kernel of a server to perform, through a schedule-class function in kernel mode, resource scheduling processing corresponding to the computational resource scheduling information.

The resource scheduling method provided by the embodiment applies to a scheduling component in user mode, wherein the scheduling component is configured in a server including multiple virtual network elements. The server may be a Center Cloud server or Edge Cloud server. In practice, besides applications such as the multiple virtual network elements, a third-party application may also be deployed in the server, wherein the third-party application may include applications conducting other computing and processing on data received and sent by the virtual network elements. For example, if the virtual network elements receive the environmental or driving data sensed by in-vehicle terminals, the third-party application may include an artificial intelligence application used for feature recognition for this environmental data.

FIG. 2 is a structural schematic diagram of a server according to an embodiment of the present application. The server, as shown in FIG. 2, includes: a scheduling component, multiple virtual network elements sensitive to latency (virtual network element 1, virtual network element 2, . . . , virtual network element K), a schedule-class function and multiple computational resources (CPU-1, CPU-2, . . . , CPU-m).

In practice, operating system of the server, as basic software directly running over the hardware, directly controls and manages the computational resources in the server. Usually, the architecture of the operating system of the server may be divided into user mode and kernel mode (also referred to as user space and kernel), wherein the kernel is used for controlling the computational resources of the server and providing operating environment for applications; and various applications run in the user mode, rely on the computational resources provided by the kernel, and thus the applications are capable to run and realize the corresponding functions.

As shown in FIG. 2, in the present embodiment, the scheduling component and the multiple virtual network elements are in the user mode and serve as applications, and the schedule-class function is included in the kernel and in the kernel mode. The scheduling component is amounted to a decision maker for determining the result of resource scheduling, and the schedule-class function is amounted to an executor for executing the corresponding resource scheduling processing in accordance with the result of resource scheduling.

When scheduling the computational resources corresponding to the multiple virtual network elements through the scheduling component, in summary, first it is required to obtain the scheduling indicator, i.e., the idle time point corresponding to respective virtual network element of the multiple virtual network elements; then, based on the idle time point, determine the load status of the multiple virtual network elements; then, determine the scheduling solution of computational resources matching the load status of the multiple virtual network elements, and execute the scheduling solution by the kernel.

Optionally, based on a preset scheduling period, the idle time point corresponding to respective virtual network element of the multiple virtual network elements may be obtained at target scheduling time, wherein the scheduling period may be configured based on the condition of the virtual network elements actually deployed in the server, and the target scheduling time may be understood as the start time of the current scheduling period. At each scheduling period, the scheduling component may poll to obtain the currently corresponding idle time point for each virtual network element.

Optionally, the scheduling period may be determined based on the number of the virtual network elements running in the server, or the degree of sensitivity of the virtual network elements to the latency. For example, if the number of virtual network elements running in the server is large, configure a small scheduling period, or, if the degree of sensitivity of the virtual network elements to the latency is high, configure a small scheduling period to schedule the computational resources for each virtual network element in time and avoid causing latency in the load tasks due to insufficient resources.

In the present embodiment, the idle time point of a virtual network element X acquired at the target scheduling time is actually an idle time point determined to be close to the target scheduling time among the idle time points corresponding to the virtual network element X, which may also be understood as the latest idle time point generated by the virtual network element X.

At the target scheduling time, after obtaining the latest idle time point corresponding to respective virtual network element of the multiple virtual network elements through polling, traversing, etc., the scheduling component further determine, based on the time difference between the target scheduling time and the idle time point corresponding to respective virtual network element of the multiple virtual network elements, load status of the multiple virtual network elements. If a virtual network element is in a high-load state, add computational resources for the virtual network element; if a virtual network element is in a low-load state, reduce the computational resources taken up by the virtual network element. Therefore, the computational resource scheduling information of the multiple virtual network elements is determined.

Then, the computational resource scheduling information is sent to the kernel of the server. The kernel of the server includes the schedule-class function through which the computational resource scheduling information may be transformed into kernel-executable information, and the kernel may further schedule the computational resources for the multiple virtual network elements based on the executable information.

To summarize, in the present embodiment, the function of recording a corresponding time point at which no load task is polled by a worker thread in any of the virtual network elements as the idle time point is realized in the scheduling component. Based on the function, the scheduling component is able to sense the load status of each virtual network element without modifying the program code of each virtual network element, and thus the implementation is simple and the universality is high. In addition, since the scheduling component may poll the load status of each virtual network element periodically, and the scheduling component as well as the multiple virtual network elements serve as applications and are in the user mode, hence high interaction speed is achieved. Moreover, the interacted information at the interaction is the idle time point corresponding to respective virtual network element of the multiple virtual network elements, and thus the amount of information is small. Therefore, the communication cost and computational cost of the scheduling component during the process of scheduling are small, and thus the scheduling processing is effective. Therefore, it is realized that the computational resources are scheduled on a finer-grained time basis, which facilitates the improvement of the utilization of computational resources in the server.

FIG. 3 is a flow chart of another resource scheduling method according to an embodiment of the present application, wherein the method is applied to the scheduling component in the server shown in the FIG. 2. As shown in FIG. 3, the method includes the following steps.

301, for a target virtual network element among the multiple virtual network elements, based on a first system call function in the target virtual network element, mapping the first system call function to a second system call function implemented in the scheduling component through a configured instruction, so that the second system call function is called in response to no load task being polled by a worker thread in the target virtual network element call; wherein the target virtual network element is any of the multiple virtual network elements.

302, in response to the second system call function being called, recording an idle time point through the second system call function; and at the target scheduling time, determining an idle time point close to the target scheduling time from the recorded idle time point corresponding to the target virtual network element.

303, based on the time differences between the target scheduling time and the idle time point corresponding to respective virtual network element of the multiple virtual network elements and close to the target scheduling time, determining the load status of the multiple virtual network elements.

304, determining the computational resource scheduling information of the multiple virtual network elements based on the load status of the multiple virtual network elements.

305, sending the computational resource scheduling information to the kernel of the server to perform, through the schedule-class function in the kernel mode, the resource scheduling processing corresponding to the computational resource scheduling information.

In the present embodiment, based on steps 301 and 302, the process of acquiring, by the scheduling component at the target scheduling time, the idle time point corresponding to respective virtual network element of the multiple virtual network elements which is close to the target scheduling time is described in detail. The specific processes of steps 303 to 305 may refer to the aforementioned embodiments, which will not be repeated in the present embodiment.

In a practical use, the process of acquiring the idle time point corresponding to any one of the multiple virtual network elements which is close to the target scheduling time is similar to each other. In the present embodiment, a virtual network element (i.e., the target virtual network element) among the multiple virtual network elements is taken as an example for description.

In step 301, the first system call function may be understood as a system call function originally configured in the target virtual network element, i.e., the system call function (an internal system call function), as specified in the program code of the virtual network element described above, that is called in response to no load task being polled by a worker thread. The first system call function is called if any one of the worker threads of the target virtual network element fails to poll a load task.

Optionally, the configured instruction for mapping the first system call function to the second system call function (an external system call function) implemented in the scheduling component may be implemented based on an environmental variable LD_PRELOAD, which is not limited. Specifically, based on the LD_PRELOAD, the link of the first system call function that is called in response to no load task being polled by the worker thread is redirected (that is, mapped) to the second system call function, so that if the worker thread in the target virtual network element fails to poll a load task, the second system call function implemented in the scheduling component is called based on the link, instead of calling the first system call function originally configured in the target virtual network element.

To facilitate understanding, for example, assume that at a moment t1, no load task from a task queue X of a virtual network element X among multiple virtual network elements is polled by a worker thread i corresponding to the virtual network element X. Based on the original configuration of the virtual network element X, at the moment t1, the worker thread i will call the system call function (i.e., the first system call function) in the virtual network element X. However, in the present embodiment, since the first system call function is mapped, through the configured instruction, to the second system call function implemented in the scheduling component, the worker thread i actually calls the second system call function at the moment t1. Since the second system call function is implemented in the scheduling component, the scheduling component may record the idle time point of the virtual network element X through the second system call function (in this example, the idle time point is generated by the worker thread i).

In addition, for the second system call function, optionally, assume that the first system call function is sleep function, i.e., its name is 'sleep', then the function name of the second system call function may still be 'sleep', while the function body is different from that of the first system call function. In the function body of the second system call function, a system call function customized may be written, wherein this function may realize the function of suspending the worker thread generating the idle time point and releasing the CPU taken up by such worker thread. Suspending the worker thread amounts to pausing the use of that worker thread, and stopping it from idly polling the task queue.

It can be understood that every time a worker thread in the virtual network element X fails to poll a load task, the scheduling component will record the idle time point of the virtual network element X. During the operation of the virtual network element X, the scheduling component may record multiple idle time points of the virtual network element X, such as: an idle time point t1 at which no load task is polled by the worker thread i, an idle time point t3 at which no load task is polled by the worker thread j, an idle time point t5 at which no load task is polled by the worker thread k.

In the present embodiment, if the target scheduling time is t6, and t5 is the closest idle time point to t6, then the idle time point t5 corresponding to the virtual network element X is acquired at the target scheduling time t6.

In a practical use, system call functions in virtual network elements with different implementations may be different.

For multiple virtual network elements in the server, the mapping relation between the internal system call function of each virtual network element and the second system call function implemented in the scheduling component may be determined through the configured instruction, so that the scheduling component is compatible to multiple virtual network elements and thus the idle time points of the multiple virtual network elements can be acquired.

Furthermore, since the scheduling component is in the user mode, even if a change occurs in virtual network elements in the server, new virtual network elements may be compatible by modifying the configured instruction in the scheduling component, wherein such modification will not affect the kernel of the server, and is easy to implement and convenient to debug.

It can be understood that, during the operation of a virtual network element, each worker thread takes up a corresponding computational resource, such as: worker thread 1 of virtual network element A takes up CPU-1, and worker thread 2 of virtual network element A takes up CPU-2. As described above, if it is desired to schedule the computational resources corresponding to multiple virtual network elements, the computational resources should be in a schedulable state, that is a non-occupied state.

Optionally, after the scheduling component recording the idle time point corresponding to the target virtual network element through the second system call function, the method further includes: suspending a worker thread that generates the idle time point in the target virtual network element, and releasing the computational resource taken up by the worker thread. Thus, the computational resource taken up by the worker thread generating the idle time point is in the schedulable state.

In the present embodiment, through the second system call function implemented in the scheduling component, the scheduling indicator, i.e., the idle time points generated by each virtual network element when no load task is polled, can be obtained without modifying the program code of each virtual network element. Then, the load status of the multiple virtual network elements and the computational resource scheduling information are determined. According to the present embodiment, the implementation is simple and the universality is high, which can be compatible with virtual network elements of the same type with the same or different implementations.

FIG. 4 is a flow chart of another resource scheduling method according to an embodiment of the present application, which is applied to the scheduling component in the server shown in FIG. 2. As shown in FIG. 4, the method includes:

401, acquiring, at target scheduling time, an idle time point corresponding to respective virtual network element of multiple virtual network elements, wherein the idle time point corresponds to a time point at which no load task is polled by a worker thread in the virtual network element.

402, for a target virtual network element among the multiple virtual network elements, if a time difference between the target scheduling time and the idle time point corresponding to the target virtual network element is smaller than a set threshold, determining that the target virtual network element is in a low-load state; if the time difference between the target scheduling time and the idle time point corresponding to the target virtual network element is equal to or larger than the set threshold, determining that the target virtual network element is in a high-load state; wherein the target virtual network element is any one of the multiple virtual network elements.

403, if the target virtual network element is in the low-load state, determining, from a computational resource currently released by the target virtual network element, a set number of a first computational resource to be reduced, and writing the first computational resource to be reduced to an idle computational resource of the server; if the target virtual network element is in the high-load state, determining, from the idle computational resource of the server and a computational resource taken up by at least one third-party application, a set number of a second computational resource to be added for the target virtual network element.

404, determining computational resource scheduling information of the multiple virtual network elements, wherein the computational resource scheduling information describes computational resource addition or reduction information corresponding to respective virtual network element of the multiple virtual network elements.

405, sending the computational resource scheduling information to the kernel of the server to perform, through the schedule-class function in kernel mode, resource scheduling processing corresponding to the computational resource scheduling information.

In the present embodiment, based on steps 402 to 404, the process of the scheduling component determining, after acquiring the idle time point corresponding to respective virtual network element of the multiple virtual network elements at the target scheduling time, the computational resource scheduling information of the multiple virtual network elements is described in detail. The specific process of steps 401 and 405 may refer to the aforementioned embodiments, which will not be repeated in the present embodiment.

It can be understood that, for any one of the multiple virtual network elements (referred to as the target virtual network element), if the time difference between the latest idle time point of the target virtual network element and the target scheduling time is relatively small, it indicates that near the target scheduling time, the target virtual network element has at least one worker thread failing to poll a load task, and thus the number of the load tasks in the task queue is relatively small, the load of the target virtual network element is low. If the time difference between the latest idle time point of the target virtual network element and the target scheduling time is relatively large, it indicates that near the target scheduling time, multiple worker threads in the target virtual network element have polled load tasks, and thus the number of the load tasks in the task queue is large, the load of the target virtual network element is high.

In a practical use, a set threshold such as 30 ms may be customized. After determining the time difference between the target scheduling time and the latest idle time point corresponding to the target virtual network element, the load status of the target virtual network element is determined based on the comparison between the time difference and the set threshold.

Optionally, when customizing the above-mentioned set threshold, a user may determine the set threshold based on the number of the multiple virtual network elements included in the server (i.e., total number of the virtual network elements) or the number of the worker threads corresponding to the multiple virtual network elements in the server (i.e., total number of the worker threads). The number of the worker threads corresponding to the multiple virtual network elements may be obtained based on the number of worker threads allowed to start up in each virtual network element and the number of the virtual network elements. The scheduling component may be configured for outputting the above-mentioned numbers to the user for reference and setting the above-mentioned threshold. For example, if the total number of virtual network elements is large, or the total number of worker threads is large, a small set threshold is set, such as 10 ms, 20 ms. If the total number of virtual network elements is small or the total number of worker threads is small, a large set threshold is set, such as 40 ms. In fact, the above-mentioned total number of worker threads and the total number of virtual network elements reflect the global load status of the virtual network elements in a coarse-grained level. Setting a smaller threshold for higher load may ensure the computational resources to be scheduled more frequently to accommodate the circumstance of high load tasks with sensitivity to latency. Conversely, setting a larger threshold for lower load may ensure a proper balance between ensuring the computational resources to be scheduled in time and controlling the scheduling cost.

After that, if a virtual network element is in the low-load state, the computational resources taken up by it should be reduced; if a virtual network element is in the high load state, the computational resources should be added for it.

It can be understood that the server includes, beside the multiple virtual network elements, at least one third-party application, which is less sensitive to latency. During the task execution, the task may be interrupted and the computational resources taken up may be provided to the virtual network elements for use.

Therefore, in a practical use, when determining the computational resource scheduling information of multiple virtual network elements, for any one of the multiple virtual network elements (i.e., the target virtual network element), specifically, if the target virtual network element is in the low-load state, the set number of the first computational resource to be reduced is determined from the computational resources currently released by the target virtual network element, and the reduced first computational resource is written to the idle computational resources of the server. If the target virtual network element is in the high-load state, a set number of a second computational resource to be added for the target virtual network element is determine from the idle computational resources of the server and a computational resource taken up by at least one third-party application. Since if any worker thread j in the target virtual network element fails to poll a load task, the idle time point generated by the worker thread j will be recorded through the second system call function implemented in the scheduling component, the worker thread j will be suspended and the computational resource taken up by the worker thread j will be released. Therefore, the scheduling component can know the information of the computational resources released by the target virtual network element and further determine, in response to the virtual network element being in the low-load state, the set number of the first computational resource to be reduced from the computational resources currently released by the target virtual network element.

The above-mentioned idle computational resources of the server include: computational resources correspondingly released by the multiple virtual network elements at the historical scheduling time and are not currently used again (i.e., the computational resources reduced in the low-load state, such as: CPU-x reduced for virtual network element 1 in the low-load state and CPU-y reduced for virtual network element 2 in the low-load state), and computational resources haven not been used by any virtual network element.

To facilitate the description, in the following, the computational resources correspondingly released by the multiple virtual network elements at the historical scheduling time and are not currently used again are referred to as third computational resources correspondingly released by the multiple virtual network elements at the historical scheduling time.

The computational resources correspondingly released by the multiple virtual network elements at the historical scheduling time usually include cache information of the corresponding virtual network element. For example, CPU-x correspondingly released by virtual network element 1 at the historical scheduling time includes the cache information of the virtual network element 1. It can be understood that, if CPU-x is added to the virtual network element 1 as idle computational resources, since the CPU-x includes the cache information of virtual network element 1, the time cost due to the use of the CPU-x by the virtual network element 1 may be reduced. However, if the CPU-x is added to the virtual network element 2 as idle computational resources, since the CPU-x contains the cache information of the virtual network element 1, the virtual network element 2 needs to clear the cache information before configuring related settings, leading to large time cost.

For this reason, in an optional embodiment, when adding the set number of the second computational resource to the target virtual network element, the addition is performed in the following order: the third computational resource released by the target virtual network element at the historical scheduling time, the computational resources that have not been used by any virtual network element and the computational resource taken up by the third-party application. Optionally, the set number may be 1, 2, etc.

Specifically, if there exist the third computational resources released by the target virtual network element at the historical scheduling time in the idle computational resources of the server, it is determined that the second computational resource added to the target virtual network element include the third computational resources. If the idle network element, wherein the sum of the number of the third computational resources and i is equal to the set number above. If the idle computational resources of the server (including the third computational resources and the computational resources that have not been used by any virtual network element) is smaller than the set number above, i.e., not sufficient for providing the second computational resource, the idle computational resources of the server and j computational resources taken up by the third-party application are added to the target virtual network element, wherein the sum of the number of the idle computational resources of the server and j is equal to the set number above.

It can be understood that the server includes a large number of computational resources, whilst the number of the multiple virtual network elements and the number of the worker threads in each virtual network element in the server are limited. For this reason, in a practical use, generally for a virtual network element Y, the third computational resources released by the virtual network element Y at the historical scheduling time and the computational resources that have not be used by any virtual network element included in the idle computational resources of the server are sufficient for providing the set number of the second computational resource for the virtual network element Y in high-load state, and it is not necessary to call the computational resources taken up by the third-party application or the computational resources released by virtual network elements other than the virtual network element Y at the historical scheduling time.

In the following, a virtual network element Z is taken as an example to describe the process of adding or reducing computational resources for the virtual network element Z.

Assume that before the target scheduling time T, the information of available computational resources corresponding to Z virtual network elements, which are maintained in the scheduling component, is shown in Table 1.

TABLE 1

| Information of available computational resources corresponding to Z virtual network elements | | | | |
|---|---|---|---|---|
| virtual network element | Virtual network element 1 | Virtual network element 2 | ... | Virtual network element Z |
| computational resource | CPU-1 ... CPU-5 | CPU-6 ... CPU-9 | ... CPU-a | CPU-b CPU-c | computational resources of the server are not sufficient for providing the second computational resource, the second computational resource is determined from the computational resource taken up by at least one third-party application.

More specifically, if the number of third computational resources in the idle computational resources of the server is larger than or equal to the set number above, the set number of computational resources are determined from the third computational resources as the second computational resource to be added to the target virtual network element. If the number of third computational resources in the idle computational resources of the server is smaller than the set number above, the third computational resources as well as i computational resources that have not been used by any virtual network element are added to the target virtual As shown in Table 1, the virtual network element Z takes up 3 CPUs: CPU-a, CPU-b and CPU-c. Assume that CPU-a is taken up by worker thread 1 of the virtual network element Z, CPU-b is taken up by worker thread 2 of the virtual network element Z, and CPU-c is taken up by worker thread 3 of the virtual network element Z.

If the set threshold for determining the load status of the virtual network element is 30 ms, the set number of the first computational resource to be reduced from or the set number of the second computational resource to be added to the virtual network element is 1 (in a practical use, the set number of addition or reduction of computational resources may be different). At the target scheduling time T, the idle time point t1 corresponding to the virtual network element Z is acquired, wherein the idle time point t1 is generated in response to no load task being polled by the worker thread 3 of the virtual network element Z.

Firstly, the process of reducing the set number of the first computational resource for virtual network element Z is described.

If the time difference between the target scheduling time T and the idle time point t1 is less than 30 ms, it is indicated that the virtual network element Z is in low-load state, and it needs to reduce one CPU from the CPUs currently released by the virtual network element Z and write the reduced CPU to the idle computational resources of the server.

In the present embodiment, the idle time point of the virtual network element Z acquired at the target scheduling time T is the latest idle time point corresponding to the virtual network element Z. In fact, at a certain time period, there may exist more than one worker thread that fails to poll a load task and release a CPU. For example, the worker thread 2 of the virtual network element Z also have not polled a load task at time t0, and thus an idle time point t0 is generated and CPU-b is released. However, since the idle time point t0 is prior to the idle time point t1, the idle time point acquired by the scheduling component at the target scheduling time T is the idle time point t1, while in fact the CPU-b and CPU-c are both released.

Therefore, based on the assumption above, if the CPU currently released by the virtual network element Z is only the CPU-c, the scheduling component reduces the CPU-c and writes the CPU-c to the idle computational resources of the server. If the CPUs currently released by the virtual network element Z are the CPU-b and CPU-c, the scheduling component reduces one CPU among the CPU-b and CPU-c, e.g., reduces the CPU-c and writes the CPU-c to the idle computational resources of the server. At the next target scheduling time T1, if the time difference between the target scheduling time T1 and an idle time point of the virtual network element Z acquired at the target scheduling time T1 is still less than 30 ms, another CPU, i.e., CPU-b is reduced and written to the idle computational resources of the server.

At target scheduling time Tm after the target scheduling time T1, if the time difference between the target scheduling time Tm and an idle time point of the virtual network element Z acquired at the target scheduling time Tm is still less than 30 ms, while the virtual network element Z currently does not have a released CPU, the operation of reducing a CPU for the virtual network element Z is not performed anymore at the target scheduling time Tm.

It can be understood that, if the virtual network element Z have not generated any new idle time point between the target scheduling time T and target scheduling time Tn, the idle time points obtained at the target scheduling time T, target scheduling time T1, . . . , and target scheduling time Tn are all the idle time point t1. It can be understood that, with the change of target scheduling time, the difference between the target scheduling time and the idle time point t1 gets larger, and in response to the difference between the target scheduling time and the idle time point exceeding 30 ms, it is indicated that the virtual network element Z is in the high-load state and the set number of the second computational resource is required to be added.

The process of adding the set number of the second computational resource to the virtual network element Z is described in the following.

If the time difference between the target scheduling time T and the idle time point t1 is more than or equal to 30 ms, it is indicated that the virtual network element Z is in the high-load state, and it needs to add one CPU, determined from the idle computational resources of the server and a CPU taken up by at least one third-party application, for the virtual network element Z.

Assume that CPU-1 is the computational resource released by the virtual network element 1 at the target scheduling time T, CPU-10 is the computational resource released by the virtual network element 2 at the historical scheduling time, CPU-d is the computational resource released by the virtual network element Z at the historical scheduling time, CPU-0 is the computational resource have not been used by any virtual network element, and CPU' is the computational resource taken up by the third-party application.

Based on the above assumption that the set number is 1, if the idle computational resources of the server include: CPU-1, CPU-10, CPU-d and CPU-0, the CPU-d is added to the virtual network element Z. If the idle computational resources of the server include: CPU-1, CPU-10, and CPU-0, the CPU-d is added to the virtual network element Z. If the idle computational resources of the server include: CPU-1 and CPU-10, and the third-party application takes up the CPU', the CPU' is added to the virtual network element Z.

In a practical use, optionally, the set number of the second computational resource to be added to a virtual network element may be configured based on the discrepancy between the set threshold and the time difference between the target scheduling time and the idle time point of the virtual network element. For example, if the time difference between the target scheduling time T and the idle time point t1 of the virtual network element Z is more than 30 ms, e.g., 3 times of 30 ms, the set number may be configured to be 3, i.e., 3 CPUs are added to the virtual network element Z at a time. If the idle computational resources of the server include CPU-1, CPU-10, CPU-d and CPU-0, and the third-party application takes up the CPU', the CPU-d, CPU-0 and CPU' are added to the virtual network element Z.

It should be noted that, the number of worker threads included in a virtual network element is actually limited, and each worker thread takes up one CPU. Therefore, when adding a set number of CPU(s) to the virtual network element, the CPU(s) will not be added infinitely to a virtual network element due to the difference between the target scheduling time and the idle time point larger than the set threshold. If the number of CPUs taken up by the virtual network element matches the number of the worker threads included therein, no CPU will be added to the virtual network element even if the difference between the target scheduling time and the idle time point is larger than the set threshold.

After that, the computational resource scheduling information of multiple virtual network elements is determined based on the computational resource addition or reduction information corresponding to respective virtual network element of the multiple virtual network elements.

In an optional embodiment, the scheduling component in the aforementioned embodiment may also be used for scheduling resources for at least one third-party application in the server.

Optionally, after determining the computational resource scheduling information of the multiple virtual network elements, if there exist idle computational resources in the server, the computational resource to be added to the at least one third-party application is determined from the idle computational resources of the server.

Specifically, the computational resource to be added to the at least one third-party application is determined from the idle computational resources of the server according to the load of the at least one third-party application.

Optionally, if the number of tasks and/or amount of data to be proceed of the third-party application is larger than or equal to a set load threshold, the computational resource to be added to the at least one third-party application is determined from the idle computational resources of the server.

Optionally, based on the degree of the number of tasks and/or amount of data to be proceed of the third-party application exceeding the set load threshold, a target number of computational resources to be added to the at least one third-party application is determined from the idle computational resources of the server; the target number of computational resources determined from the idle computational resources of the server are added to the corresponding third-party application.

After that, the computational resource addition or reduction information of the multiple virtual network elements as well as the computational resource addition information of the at least one third-party application are together taken as the computational resource scheduling information and sent to the kernel of the server, to complete, through the schedule-class function in kernel mode, resource scheduling processing corresponding to the computational resource scheduling information.

In the present embodiment, at the current scheduling time, idle computational resources in the server may be scheduled to a third-party application for use, wherein the idle computational resources in the server include computational resources released by, i.e., reduced from virtual network elements in the low-load state. That is to say, the resource scheduling method provided by the present embodiment breaks the original limit that the virtual network elements need to exclusively take up computational resources, and the computational resources corresponding to the virtual network elements may be shared with third-party applications. Sharing computational resources among virtual network elements and third-party applications can significantly improve the utilization of the computational resources in the server.

Another alternative embodiment provides another resource scheduling method, applied to a scheduling component in user mode, wherein the scheduling component is configured in a server including multiple virtual network elements. The scheduling component include: a detection program corresponding to respective virtual network element of the multiple virtual network elements and a scheduling program shared by the multiple virtual network elements.

FIG. 5 is a schematic diagram of the multiple virtual network elements and scheduling component according to an embodiment of the present application. As shown in FIG. 5, each virtual network element corresponds to a detection program, for example, virtual network element 1 corresponds to detection program 1, virtual network element 2 corresponds to detection program 2, . . . , virtual network element k corresponds to detection program k, and the k detection programs share one scheduling program.

A second system call function is implemented in all the k detection programs. The second system call function is used for recording a time point at which no load task is polled by a worker thread in a virtual network element, i.e., an idle time point. The specific process may refer to the above embodiment, which will not be repeated herein. It should be noted that, the second system call function included in each of the k detection programs is not necessarily identical to one another, because the first system call functions implemented in the corresponding different virtual network elements are different, leading to the fact that each second system call function, as a result of redirection of different first system call functions, may be different from one another as well.

The scheduling program is used for, based on the idle time points of the virtual network elements recorded by the k detection programs, determining the scheduling solution of the computational resources (CPU-1, CPU-2, . . . , CPU-m) corresponding to the multiple virtual network elements.

FIG. 6 is a flow chart of another resource scheduling method according to an embodiment of the present application, applied to the scheduling component shown in the FIG. 6. As shown in FIG. 6, the method includes the following steps.

601, in response to a second system call function being called, a target detection program records an idle time point of a target virtual network element through the second system call function, sends the idle time point to the scheduling program, suspends a worker thread generating the idle time point in the target virtual network element and releases the computational resource taken up by the worker thread.

The target virtual network element is any one of the multiple virtual network elements, the target detection program is a detection program corresponding to the target virtual network element.

602, at target scheduling time, the scheduling program determines an idle time point close to the target scheduling time from the received idle time point corresponding to the target virtual network element.

603, based on the time differences between the target scheduling time and the idle time point corresponding to respective virtual network element of the multiple virtual network elements and close to the target scheduling time, the scheduling program determines load status of the multiple virtual network elements.

604, based on the load status of the multiple virtual network elements, the scheduling program determines the computational resource scheduling information of the multiple virtual network elements.

605, the scheduling program sends the computational resource scheduling information to the kernel of the server to perform, through a schedule-class function in kernel mode, resource scheduling processing corresponding to the computational resource scheduling information.

To facilitate understanding, an example is described in combination with FIG. 5 and FIG. 6.

Assume that at moment t1, no load task is polled by worker thread 1 in virtual network element 1, and the second system call function in the detection program 1 is called. Then, in response to the second system call function being called, the detection program 1 records idle time point t1 of the virtual network element 1 through the second system call function implemented therein, and sends the idle time point t1 to the scheduling program.

After that, assume that at moment t2, no load task is polled by worker thread "a" in the virtual network element 1, and the second system call function in the detection program 1 is called. Then, in response to the second system call function being called, the detection program records idle time point t2 of the virtual network element 1 through the second system call function implemented therein, and sends the idle time point t2 to the scheduling program.

Assume that the target scheduling time is T, t1 and t2 are prior to the target scheduling time T with t2 closer to the target scheduling time T. Then, at the target scheduling time T, the scheduling program determines, from the received idle time points corresponding to the virtual network element 1 (idle time point t1 and idle time point t2), that it is the idle time point t2 closer to the target scheduling time T.

Similar to the above process, detection program 2 records idle time points of virtual network element 2, and sends the idle time points to the scheduling program. At the target scheduling time T, the scheduling program determines an idle time point close to the target scheduling time T from the received idle time points corresponding to the virtual network element 2. Detection program k records idle time points of virtual network element k and sends the idle time points to the scheduling program. At the target scheduling time T, the scheduling program determines an idle time point close to the target scheduling time T from the received idle time points corresponding to the virtual network element k.

Optionally, in the step 601, after recording the idle time point of the target virtual network element, the target detection program stores the idle time point of the target virtual network element. Then, at the target scheduling time, in response to a request of acquiring an idle time point sent from the scheduling component, the stored at least one idle time point corresponding to the target virtual network element is sent to the scheduling program, so that the scheduling program determines an idle time point close to the target scheduling time from the received idle time point corresponding to the target virtual network element. Optionally, an idle time point close to the target scheduling time in the stored at least one idle time point corresponding to the target virtual network element is sent to the scheduling program.

After that, the scheduling program determines the resource scheduling solution based on the target scheduling time and the idle time point corresponding to respective virtual network element of the k virtual network elements and close to the target scheduling time. The specific implementations of the steps 603 to 605 shown in FIG. 6 may refer to the previous embodiments, which will not be repeated herein.

It should be noted that, in specific implementations of the step 604, in a case that the target virtual network element is in low-load mode, the scheduling program determines, from the computational resources currently released by the target virtual network element, a set number of a first computational resource to be reduced.

In the present embodiment, the second system call function is implemented in the detection program which suspends worker threads generating the idle time points in the virtual network element and releases the computational resources taken up by the worker threads, so that the detection program can know the information of the computational resources currently released by the target virtual network element, whilst the scheduling program does not know the information of the computational resources currently released by the target virtual network element. Therefore, before determining the set number of the first computational resource to be reduced from the computational resources currently released by the target virtual network element, the scheduling program needs to obtain the information of the computational resources currently released by the target virtual network element. It may be understood that, after recording an idle time point generated by a worker thread that have not polled any load task, a monitor program suspending this worker thread and releasing the computational resource taken up by that worker thread need to be implemented with the help of the kernel. Therefore, the kernel knows in fact the operation status of each computational resource, i.e., whether a computational resource is taken up by a worker thread of a virtual network element. Optionally, the scheduling program may obtain the information of the computational resources currently released by the target virtual network element through interacting with the kernel, and further determine the set number of the first computational resource to be reduced from the computational resources currently released by the target virtual network element.

In the following, as an example, taking a virtual network element as a distributed unit in a virtual base station to describe the resource scheduling method provided by the present embodiment.

FIG. 7 is a structural schematic diagram of a base station according to an embodiment of the present application. As shown in FIG. 7, the base station includes a baseband unit (BBU for short), which can be divided into a centralized unit (CU for short) and at least one distributed unit (DU for short). The CU and DU include respectively multiple worker threads for executing different load tasks. The load tasks executed correspondingly by the CU are load tasks with low real-time demand, such as transmitting entertainment media data. The load tasks executed correspondingly by the DU are load tasks with high real-time demand, such as transmitting vehicle navigation data. Due to its low real-time demand, the CU may be considered as a special third-party application.

FIG. 8 is a flow chart of another resource scheduling method according to an embodiment of the present application, applied to a scheduling component in user mode, wherein the scheduling component is configured in a server including multiple virtual base stations, and wherein the multiple virtual base stations include multiple distributed units. As shown in FIG. 8, the method includes the following steps.

801, acquiring, at target scheduling time, an idle time point corresponding to respective distributed unit of multiple distributed units, wherein the idle time point corresponds to a time point at which no load task is polled by a worker thread in the distributed unit.

802, determining load status of the multiple distributed units based on time differences between the target scheduling time and the idle time point corresponding to respective distributed unit of the multiple distributed units.

803, determining computational resource scheduling information of the multiple distributed units based on the load status of the multiple distributed units.

804, sending the computational resource scheduling information to a kernel of a server to perform, through a schedule-class function in kernel mode, resource scheduling processing corresponding to the computational resource scheduling information.

The distributed units in the steps 801 to 804 are virtual network elements sensitive to latency, the specific implementation may refer to the previous embodiments, which will not be repeated in the present embodiment.

The resource scheduling method provided by the embodiments of the present application is compatible with multiple virtual base stations with different implementations, which can timely schedule computational resources for the distributed units sensitive to latency in the virtual base station, and improve utilization of the computational resources in the server.

Optionally, the resource scheduling method provided by the present embodiment may be used for scheduling resources for CU in virtual base stations.

Optionally, after determining the computational resource scheduling information of the multiple DUs, if there exist idle computational resources in the server, computational resources to be add to the CN are determined from the idle computational resources of the server.

Specifically, based on the load of the CU, the computational resources to be add to the CU are determined from the idle computational resources of the server.

Optionally, if the number of tasks and/or amount of data to be proceed of the CU is larger than or equal to the set load threshold, the computational resources to be added to the CU are determined from the idle computational resources of the server.

Optionally, based on the degree of the number of tasks and/or amount of data to be proceed of the CU exceeding the set load threshold, a target number of the computational resources to be added to the CU are determined from the idle computational resources of the server, and the target number of computational resources determined from the idle computational resources of the server are added to the corresponding CU.

After that, the computational resource addition or reduction information of the multiple DU as well as the computational resource addition information of the CU are together taken as the computational resource scheduling information and sent to the kernel of the server, to complete, through the schedule-class function in kernel mode, resource scheduling processing corresponding to the computational resource scheduling information.

To facilitate understanding, a scene of transmitting driving data between a vehicle terminal and a virtual base station is taken as an example to describe the resource scheduling method of the embodiment of FIG. 8.

FIG. 9 is a schematic diagram of a scene of the resource scheduling method according to an embodiment of the present application. For example, in a scene of Internet of vehicles, a vehicle terminal usually needs a virtual base station to execute several tasks of transmitting vehicle driving data, such as forwarding vehicle driving data to an application server corresponding to the vehicle terminal. The vehicle driving data include vehicle speed, vehicle traveling direction, etc.

After receiving a driving data processing task q sent from the vehicle terminal, the server first, based on the location of the vehicle terminal, determines the virtual base station corresponding to the terminal, and stores the driving data processing task q triggered by the vehicle terminal to a task queue corresponding to a distributed unit of the corresponding virtual base station. Different virtual base stations are configured to cover different geographical areas.

In combination with FIG. 7, assume that the server includes K virtual base stations, each virtual base station includes M distributed units (in a practical use, the number of distributed units included in different virtual base stations may be different).

Then, at the target scheduling time T, an idle time point corresponding to respective distributed unit of the K×M distributed units is acquired, and load status of the K×M distributed units is determined based on the time differences between the target scheduling time T and the idle time point corresponding to respective distributed unit of the K×M distributed units. Then, based on the load status of the K×M distributed units, the computational resource scheduling information of the K×M distributed units is determined and sent to the kernel of the server including K virtual base stations, to complete, through the schedule-class function in kernel mode, resource scheduling processing corresponding to the computational resource scheduling information. The specific implementation process can refer to previous embodiments.

Finally, the K×M distributed units process the received driving data processing task q based on the computational resources after the resource scheduling processing.

Specifically, assume that the driving data processing task q is stored into the task queue corresponding to the distributed unit 1 of the virtual base station 1, and after resource scheduling processing, in the distributed unit 1 of the virtual network element 1, CPU-1 is assigned to worker thread 1, CPU-2 is assigned to worker thread 2, . . . , CPU-n is assigned to worker thread n. When n worker threads in the distributed unit 1 poll load tasks in the task queue of the distributed unit 1, assume that the worker thread 2 polls the driving data processing task q, the worker thread 2 processes the driving data processing task q with the CPU-2, such as forwarding the driving data in the driving data processing task q to the application server to complete driving data transmission.

Figure 10:
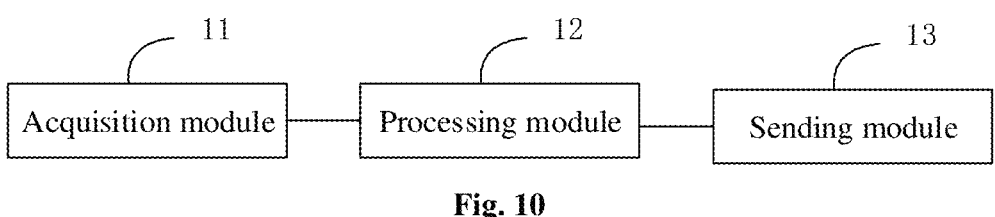
FIG. 10 is a structural schematic diagram of a resource scheduling apparatus according to an embodiment of the present application.

FIG. 10 is a structural schematic diagram of a resource scheduling apparatus according to an embodiment of the present application. As shown in FIG. 10, the apparatus is configured in a scheduling component in the user mode, wherein the scheduling component is configured in a server including multiple virtual network elements. The apparatus includes: an acquisition module 11, a processing module 12 and a sending module 13.

The acquisition module 11 is configured for acquiring, at target scheduling time, an idle time point corresponding to respective virtual network element of the multiple virtual network elements, wherein the idle time point corresponds to a time point at which no load task is polled by a worker thread in the virtual network element.

The processing module 12 is configured for, determining load status of the multiple virtual network elements based on time differences between the target scheduling time and the idle time point corresponding to respective virtual network element of the multiple virtual network elements; and determining computational resource scheduling information of the multiple virtual network elements based on the load status of the multiple virtual network elements;

The sending module 13 is configured for sending the computational resource scheduling information to a kernel of the server to perform, through a schedule-class function in kernel mode, resource scheduling processing corresponding to the computational resource scheduling information.

Optionally, the acquisition module 11 is specifically configured for, for a target virtual network element among the multiple virtual network elements, based on a first system call function in the target virtual network element, mapping the first system call class function to a second system call function implemented in the scheduling component through a configured instruction, so that the second system call function is called in response to no load task being polled by a worker thread in the target virtual network element; wherein the target virtual network element is any one of the multiple virtual network elements; in response to the second system call class function being called, recording the idle time point through the second system call function; and at the target scheduling time, determining an idle time point close to the target scheduling time from the recorded idle time point corresponding to the target virtual network element.

Optionally, the acquisition module 11 is further specifically configured for suspending a worker thread generating the idle time point in the target virtual network element and releasing the computational resource taken up by the worker thread.

Optionally, the scheduling component include a detection program corresponding to respective virtual network element of the multiple virtual network elements and a scheduling program shared by the multiple virtual network elements; wherein the second system call function corresponding to the target virtual network element is implemented in a target detection program corresponding to the target virtual network element. The acquisition module 11 is further specifically configured for, in response to the second system call function being called, recording the idle time point through the second system call function in the target detection program and sending the idle time point to the scheduling program; at the target scheduling time, determining, by the scheduling program, an idle time point close to the target scheduling time from the received idle time point corresponding to the target virtual network element.

Optionally, the processing module 12 is specifically configured for, for a target virtual network element among the multiple virtual network elements, if a time difference between the target scheduling time and the idle time point corresponding to the target virtual network element is smaller than a set threshold, determining that the target virtual network element is in a low-load state; if the time difference between the target scheduling time and the idle time point corresponding to the target virtual network element is equal to or larger than the set threshold, determining that the target virtual network element is in a high-load state.

Optionally, the processing module 12 is further configured for outputting a number of the multiple virtual network elements, or outputting a number of worker threads corresponding to the multiple virtual network elements based on the number of worker threads allowed to start up in each target virtual network element; receiving the set threshold configured by a user based on the numbers.

Optionally, the server includes at least one third-party application. The processing module 12 is further specifically configured for, if the target virtual network element is in the low-load state, determining, from a computational resource currently released by the target virtual network, a set number of a first computational resource to be reduced, and writing the first computational resource to be reduced to an idle computational resource of the server; if the target virtual network element is in the high-load state, determining, from the idle computational resource of the server and a computational resource taken up by at least one third-party application, a set number of a second computational resource to be added for the target virtual network element; wherein the computational resource scheduling information describes computational resource addition or reduction information corresponding to respective virtual network element of the multiple virtual network elements.

Optionally, the processing module 12 is further specifically configured for, determining, from the idle computational resource of the server, a computational resource to be added for the at least one third-party application based on the load of the at least one third-party application; wherein the computational resource scheduling information describes computational resource addition information for the at least one third-party application.

Optionally, the processing module 12 is further specifically configured for, if there exists, among the idle computational resource of the server, a third computational resource released by the target virtual network element at historical scheduling time, determining that the second computational resource added for the target virtual network element includes the third computational resource; if the idle computational resource of the server is insufficient to provide the second computational resource, determining the second computational resource from the computational resource taken up by the at least one third-party application.

The communication apparatus shown in FIG. 10 may execute the steps executed by the communication system in the previous embodiments, and the parts that are not depicted in detail in the present embodiment may refer to the related description of the previous embodiments, which will not be repeated herein.

The above-described apparatus embodiments are only exemplary, and the network elements described therein as separated components may or may not be physically separated. The object of the present solutions may be realized with part of all of the modules selected according to actual requirements. A person having ordinary skill in the art may understand and implement the embodiments without any creative labor.

Through the above description of the embodiments, a person having skill in the art may understand clearly that each embodiment may be implemented with the help of necessary general hardware platform, or through the combination of hardware and software. Based on such understanding, the essential technical solution above or the part contributing to the prior art may be embodied in the form of computer products. The present application may take the form of computer program products implemented in one or more computer idle storage mediums containing computer idle program code (including but not limited to disk memory, CD-ROM, optical storage, etc.)

Finally, it should be noted that the embodiments above are only for illustrating the technical solution of the present application instead of limiting it. Although the present application is depicted in detail based on the previous embodiments, a person having ordinary skill in the art should understand that modifications may be made to the technical solutions illustrated in the previous embodiments, or equivalent substitutions may be applied on part technical features thereof, while the modifications or substitutions do not lead the essences of the corresponding technical solutions to be beyond the scope and spirit of the technical solutions of the embodiments of the present application.

What is claimed is:

1. A resource scheduling method, implemented by a scheduling component in user mode, wherein the scheduling component is configured in a server comprising a plurality of virtual network elements, and the method comprises:

acquiring, at target scheduling time, a latest idle time point corresponding to respective virtual network element of the plurality of virtual network elements, wherein an idle time point corresponds to a time point at which no load task is polled by a worker thread in the virtual network element, and the latest idle time point is an idle time point from idle time points corresponding to the virtual network element which is closest to the target scheduling time, wherein the target scheduling time is a start time of a current scheduling period, and wherein the scheduling period is determined based on a degree of sensitivity of the virtual network elements to a latency;

determining load status of the plurality of virtual network elements based on time differences between the target scheduling time and the latest idle time point corresponding to respective virtual network element of the plurality of virtual network elements;

determining computational resource scheduling information of the plurality of virtual network elements based on the load status of the plurality of virtual network elements;

sending the computational resource scheduling information to a kernel of the server; and performing, through a schedule-class function in kernel mode, resource scheduling processing corresponding to the computational resource scheduling information.

2. The method of claim 1, wherein the acquiring, at the target scheduling time, the latest idle time point corresponding to respective virtual network element of the plurality of virtual network elements comprises:

for a target virtual network element among the plurality of virtual network elements, based on a first system call function in the target virtual network element, mapping the first system call function to a second system call function implemented in the scheduling component through a configured instruction, so that the second system call function is called in response to no load task being polled by a worker thread in the target virtual network element; wherein the target virtual network element is any one of the plurality of virtual network elements;

recording, in response to the second system call function being called, the idle time point through the second system call function;

determining, at the target scheduling time, an idle time point closest to the target scheduling time from the recorded idle time point corresponding to the target virtual network element as the latest idle time point.

3. The method of claim 2, wherein after recording the idle time point through the second system call function, the method further comprises:

suspending a worker thread generating the idle time point in the target virtual network element, and releasing a computational resource taken up by the worker thread.

4. The method of claim 2, wherein the scheduling component comprises a detection program corresponding to respective virtual network element of the plurality of virtual network elements and a scheduling program shared by the plurality of virtual network elements; wherein the second system call function corresponding to the target virtual network element is implemented in a target detection program corresponding to the target virtual network element;

the recording, in response to the second system call function being called, the idle time point through the second system call function comprises:

recording, in response to the second system call function being called, the idle time point through the second system call function in the target detection program, and sending the idle time point to the scheduling program;

the determining, at the target scheduling time, the idle time point closest to the target scheduling time from the recorded idle time point corresponding to the target virtual network element as the latest idle time point, comprises:

determining, at the target scheduling time, through the scheduling program, the idle time point closest to the target scheduling time from the received idle time point corresponding to the target virtual network element as the latest idle time point.

5. The method of claim 1, wherein the determining the load status of the plurality of virtual network elements based on the time differences between the target scheduling time and the latest idle time point corresponding to respective virtual network element of the plurality of virtual network elements comprises:

for a target virtual network element among the plurality of virtual network elements, if the time difference between the target scheduling time and the latest idle time point corresponding to the target virtual network element is smaller than a set threshold, determining that the target virtual network element is in a low-load state;

if the time difference between the target scheduling time and the latest idle time point corresponding to the target virtual network element is equal to or larger than the set threshold, determining that the target virtual network element is in a high-load state.

6. The method of claim 2, wherein the determining the load status of the plurality of virtual network elements based on the time differences between the target scheduling time and the latest idle time point corresponding to respective virtual network element of the plurality of virtual network elements comprises:

for a target virtual network element among the plurality of virtual network elements, if the time difference between the target scheduling time and the latest idle time point corresponding to the target virtual network element is smaller than a set threshold, determining that the target virtual network element is in a low-load state;

if the time difference between the target scheduling time and the latest idle time point corresponding to the target virtual network element is equal to or larger than the set threshold, determining that the target virtual network element is in a high-load state.

7. The method of claim 3, wherein the determining the load status of the plurality of virtual network elements based on the time differences between the target scheduling time and the latest idle time point corresponding to respective virtual network element of the plurality of virtual network elements comprises:

for a target virtual network element among the plurality of virtual network elements, if the time difference between the target scheduling time and the latest idle time point corresponding to the target virtual network element is smaller than a set threshold, determining that the target virtual network element is in a low-load state;

if the time difference between the target scheduling time and the latest idle time point corresponding to the target virtual network element is equal to or larger than the set threshold, determining that the target virtual network element is in a high-load state.

8. The method of claim 4, wherein the determining the load status of the plurality of virtual network elements based on the time differences between the target scheduling time and the latest idle time point corresponding to respective virtual network element of the plurality of virtual network elements comprises:

for a target virtual network element among the plurality of virtual network elements, if the time difference between the target scheduling time and the latest idle time point corresponding to the target virtual network element is smaller than a set threshold, determining that the target virtual network element is in a low-load state;

if the time difference between the target scheduling time and the latest idle time point corresponding to the target virtual network element is equal to or larger than the set threshold, determining that the target virtual network element is in a high-load state.

9. The method of claim 5, wherein the method further comprises:

outputting a number of the plurality of virtual network elements, or outputting, based on a number of worker threads allowed to start up in each virtual network element, the number of worker threads corresponding to the plurality of virtual network elements;

receiving the set threshold configured by a user based on the number.

10. The method of claim 5, wherein the server comprises at least one third-party application; and wherein the determining the computational resource scheduling information of the plurality of virtual network elements based on the load status of the plurality of virtual network elements comprises:

if the target virtual network element is in the low-load state, determining, from a computational resource currently released by the target virtual network, a set number of a set number of a first computational resource to be reduced, and writing the reduced first computational resource to an idle computational resource of the server;

if the target virtual network element is in the high-load state, determining, from the idle computational resource of the server and a computational resource taken up by the at least one third-party application, a set number of a set number of a second computational resource to be added for the target virtual network element;

the computational resource scheduling information describes computational resource addition or reduction information corresponding to respective virtual network element of the plurality of virtual network elements.

11. The method of claim 10, wherein the sever comprises at least one third-party application, and the method further comprises:

determining, from the idle computational resource of the server, a computational resource to be added for the at least one third-party application based on the load of the at least one third-party application; wherein the computational resource scheduling information further describes computational resource addition information for the at least one third-party application.

12. The method of claim 10, wherein the server comprises at least one third-party application; wherein the determining, from the idle computational resource of the server and the computational resource taken up by the at least one third-party application, the set number of the second computational resource to be added for the target virtual network element, comprises:

if there exists, among the idle computational resource of the server, a third computational resource released by the target virtual network element at historical scheduling time, determining that the second computational resource added for the target virtual network element comprises the third computational resource;

if the idle computational resource of the server is insufficient to provide the second computational resource, determining the second computational resource from the computational resource taken up by the at least one third-party application.

13. The method of claim 1, wherein the plurality of virtual network element are virtual network elements sensitive to the latency.

14. A server, comprising a scheduling component in user mode, a schedule-class function in kernel mode, a plurality of virtual network element and a plurality of computational resources;

wherein the server further comprises a processor and a memory, the memory stores executable instructions which, when executed by the processor, cause the process to perform operations of:

acquiring, at target scheduling time, a latest idle time point corresponding to respective virtual network element of the plurality of virtual network elements, wherein an idle time point corresponds to a time point at which no load task is polled by a worker thread in the virtual network element, and the latest idle time point is an idle time point from idle time points corresponding to the virtual network element which is closest to the target scheduling time, wherein the target scheduling time is a start time of a current scheduling period, and wherein the scheduling period is determined based on a degree of sensitivity of the virtual network elements to a latency;

determining load status of the plurality of virtual network elements based on time differences between the target scheduling time and the latest idle time point corresponding to respective virtual network element of the plurality of virtual network elements;

determining computational resource scheduling information of the plurality of virtual network elements based on the load status of the plurality of virtual network elements;

sending the computational resource scheduling information to a kernel of the server; and performing, through the schedule-class function in the kernel mode, resource scheduling processing corresponding to the computational resource scheduling information.

15. A resource scheduling method implemented by a scheduling component in user mode, wherein the scheduling component is configured in a server comprising a plurality of virtual base stations, and the plurality of virtual base stations comprises a plurality of distributed units; the method comprises:

acquiring, at target scheduling time, a latest idle time point corresponding to respective distributed unit of the plurality of distributed units, wherein an idle time point corresponds to a time point at which no load task is polled by a worker thread in the distributed unit, and the latest idle time point is an idle time point from idle time points corresponding to the virtual network element which is closest to the target scheduling time, wherein the target scheduling time is a start time of a current scheduling period, and wherein the scheduling period is determined based on a degree of sensitivity of the virtual network elements to a latency;

determining load status of the plurality of distributed units based on time differences between the target scheduling time and the latest idle time point corresponding to respective distributed unit of the plurality of distributed units;

determining computational resource scheduling information of the plurality of distributed units based on the load status of the plurality of distributed units;

sending the computational resource scheduling information to a kernel of the server; and performing, through a schedule-class function in kernel mode, resource scheduling processing corresponding to the computational resource scheduling information.

16. A resource scheduling method implemented by a scheduling component in user mode, wherein the scheduling component is configured in a server comprising a plurality of virtual base stations, and the plurality of virtual base stations comprise a plurality of distributed units; the method comprises:

based on a correspondence between vehicle terminals and the virtual base stations, storing driving data processing tasks triggered by the vehicle terminals into task queues corresponding to distributed units of corresponding virtual base stations;

acquiring, at target scheduling time, a latest idle time point corresponding to respective distributed unit of the plurality of distributed units, wherein an idle time point corresponds to a time point at which no driving data processing task is polled by a worker thread in the distributed unit from a corresponding task queue, and the latest idle time point is an idle time point from idle time points corresponding to the virtual network element which is closest to the target scheduling time, wherein the target scheduling time is a start time of a current scheduling period, and wherein the scheduling period is determined based on a degree of sensitivity of the virtual network elements to a latency;

determining load status of the plurality of distributed units based on time differences between the target scheduling time and the latest idle time point corresponding to respective distributed unit of the plurality of distributed units;

determining computational resource scheduling information of the multiple distributed units based on the load status of the multiple distributed units;

sending the computational resource scheduling information to a kernel of the server; and performing, through a schedule-class function in kernel mode, resource scheduling processing corresponding to the computational resource scheduling information, so that the plurality of distributed units process, based on computational resources after the resource scheduling processing, the received driving data processing tasks.

* * * * *